(12) United States Patent
Hayakawa et al.

(10) Patent No.: US 12,313,547 B2
(45) Date of Patent: May 27, 2025

(54) STATE IDENTIFICATION DEVICE, STATE IDENTIFICATION METHOD, AND STATE IDENTIFICATION PROGRAM

(71) Applicant: The University of Tokyo, Tokyo (JP)

(72) Inventors: Tomohiko Hayakawa, Tokyo (JP); Haruka Ikeda, Tokyo (JP); Norimasa Kishi, Tokyo (JP); Masatoshi Ishikawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 176 days.

(21) Appl. No.: 17/912,484

(22) PCT Filed: Mar. 17, 2021

(86) PCT No.: PCT/JP2021/010886
§ 371 (c)(1),
(2) Date: Sep. 16, 2022

(87) PCT Pub. No.: WO2021/187536
PCT Pub. Date: Sep. 23, 2021

(65) Prior Publication Data
US 2023/0168197 A1    Jun. 1, 2023

(30) Foreign Application Priority Data

Mar. 17, 2020 (JP) ................................ 2020-046932

(51) Int. Cl.
*G01N 21/64*    (2006.01)

(52) U.S. Cl.
CPC ..... *G01N 21/6456* (2013.01); *G01N 21/6408* (2013.01)

(58) Field of Classification Search
None
See application file for complete search history.

(56) References Cited

U.S. PATENT DOCUMENTS 8,581,213 B2 * 11/2013 Kimura ............. G01N 21/6428
250/459.1
11,513,118 B2 * 11/2022 Swager .................... G01J 5/02
(Continued)

FOREIGN PATENT DOCUMENTS

| CN | 102859353 A | 1/2013 |
| JP | H04-216463 A | 8/1992 |

(Continued)

*Primary Examiner* — Marcus H Taningco
*Assistant Examiner* — Djura Malevic
(74) *Attorney, Agent, or Firm* — PROCOPIO, CORY, HARGREAVES & SAVITCH LLP

(57) ABSTRACT

There are provided a state determination device, a state determination method, and a state determination program capable of determining a state of an object to be inspected. A state determination device 10 includes an irradiation unit 12 which irradiates an object to be inspected with excitation light under a predetermined irradiation condition, a measurement unit 13 which measures light emission data of light emission from the object to be inspected, which is generated with a delay with respect to the irradiation with the excitation light, and a determination unit 15 which determines a state of the object to be inspected by checking the light emission data against light emission data of light emission from the object to be inspected, which is measured in the case where the excitation light is emitted under an irradiation condition common to the light emission data for each state of a substance constituting the object to be inspected.

15 Claims, 18 Drawing Sheets

(56) References Cited

U.S. PATENT DOCUMENTS

| | | | |
|---|---|---|---|
| 11,903,755 B2* | 2/2024 | Ken | G04F 5/14 |
| 11,994,518 B2* | 5/2024 | Swager | G06V 20/80 |
| 2007/0224659 A1* | 9/2007 | Katsumata | G01N 21/6486 |
| | | | 436/172 |
| 2011/0266458 A1* | 11/2011 | Nakao | G01N 21/6408 |
| | | | 250/458.1 |
| 2013/0068965 A1 | 3/2013 | Yoshida et al. | |
| 2021/0116376 A1* | 4/2021 | Swager | C09K 11/06 |
| 2021/0116377 A1* | 4/2021 | Swager | G01N 21/76 |
| 2021/0116384 A1* | 4/2021 | Swager | G01N 21/6408 |
| 2021/0116449 A1* | 4/2021 | Swager | G01N 21/6428 |
| 2021/0117642 A1* | 4/2021 | Swager | G01N 21/645 |
| 2021/0120193 A1* | 4/2021 | Swager | H10K 50/11 |
| 2021/0123921 A1* | 4/2021 | Swager | C09K 11/06 |
| 2023/0168197 A1* | 6/2023 | Hayakawa | G01N 21/6408 |
| | | | 250/459.1 |
| 2024/0156410 A1* | 5/2024 | Chiu | A61B 5/6801 |

FOREIGN PATENT DOCUMENTS

| | | |
|---|---|---|
| JP | 2004301638 A | 10/2004 |
| JP | 2006194770 A | 7/2006 |
| JP | 2010164468 A | 7/2010 |
| WO | 2005/062027 A | 12/2004 |
| WO | 2015/037643 A | 3/2015 |

* cited by examiner

STATE IDENTIFICATION DEVICE, STATE IDENTIFICATION METHOD, AND STATE IDENTIFICATION PROGRAM

CROSS-REFERENCE TO RELATED APPLICATIONS

This application is US National Stage of International Patent Application PCT/JP2021/010886, filed Mar. 17, 2021, which claims benefit of priority from Japanese Patent Application JP2020-046932, filed Mar. 17, 2020, the contents of both of which are incorporated herein by reference.

TECHNICAL FIELD

The present invention relates to a state determination device, a state determination method, and a state determination program.

BACKGROUND ART

Conventionally, there are cases where a substance constituting an object to be inspected is determined by using light. For example, there are used absorption spectroscopy, in which an absorption spectrum is measured by irradiating an object to be inspected with light and a substance constituting the object to be inspected is thereby determined, and laser-induced breakdown spectroscopy, in which plasma light is measured by ionizing an object to be inspected with a laser and a substance constituting the object to be inspected is thereby determined. In addition, there are cases where an object to be inspected is irradiated with excitation light for a relatively long time period (several tens of seconds), and a spectrum of generated delayed fluorescence and the physical property value of a fluorescence lifetime or the like are measured.

With regard to the laser-induced breakdown spectroscopy, for example, Patent Document 1 shown below describes a substance determination system in which scattered light is measured by emitting laser light from a first laser unit, an area in which a substance is present is extracted from a measurement result, and a spectrum of plasma light is measured by emitting laser light from a second laser unit which is different from the first laser unit.

In addition, with regard to the measurement of the fluorescence lifetime, for example, Patent Document 2 shown below describes a fluorescence lifetime measurement device in which a phosphor serving as a measurement target is placed on a stage and is moved at constant speed, the phosphor is irradiated with excitation light, elapsed time and afterglow intensity are detected by using an image in which the afterglow of fluorescence generated by the excitation light is imaged, and the fluorescence lifetime is calculated.

Further, with regard to the use of the delayed fluorescence, for example, Patent Document 3 shown below describes an ornamental plant keeping quality determination device in which an ornamental plant is irradiated with excitation light, chlorophyll fluorescence and delayed fluorescence generated by the irradiation are imaged, and the keeping quality of the ornamental plant is determined based on a correlation between a ratio between the light amount of the delayed fluorescence and the light amount of the chlorophyll fluorescence, and the keeping quality of the ornamental plant.

CITATION LIST

Patent Document

Patent Document 1: WO 2015/037643
Patent Document 2: Patent Publication JP-A-2010-164468
Patent Document 3: Patent Publication JP-A-2004-301638

SUMMARY

Technical Problem

However, in the conventional art, determination of a state of an object to be inspected by using light is not examined. To cope with this, the present invention provides a state determination device, a state determination method, and a state determination program capable of determining the state of the object to be inspected by using light.

Solution to Problem

A state determination device according to an aspect of the present invention includes: an irradiation unit which irradiates an object to be inspected with excitation light under a predetermined irradiation condition; a measurement unit which measures light emission data of light emission from the object to be inspected, which is generated with a delay with respect to the irradiation with the excitation light: and a determination unit which determines a state of the object to be inspected by checking the light emission data against light emission data of light emission from the object to be inspected, which is measured in a case where the excitation light is emitted under an irradiation condition common to the light emission data for each state of a substance constituting the object to be inspected.

According to this aspect, the object to be inspected is irradiated with the excitation light under the predetermined irradiation condition and, based on the light emission data of the light emission from the object to be inspected which is generated with a delay with respect to the irradiation with the excitation light, it is possible to determine the state of the object to be inspected.

In the above aspect, the light emission data of the light emission from the object to be inspected is light emission data of delayed fluorescence and/or phosphorescence from the object to be inspected, which is generated according to the irradiation with the excitation light.

According to this aspect, the object to be inspected is irradiated with the excitation light under the predetermined irradiation condition and, based on the light emission data of the delayed fluorescence and or the phosphorescence from the object to be inspected which is generated according to the irradiation with the excitation light, it is possible to determine the state of the object to be inspected.

In the above aspect, the measurement unit may include a high speed camera which photographs the light emission at a frame rate of not less than 100 fps.

According to this aspect, by applying the high speed camera to an attenuation characteristic in which light emission intensity of light emission immediately after the irradiation with the excitation light is sharply attenuated, for the first time, it is possible to acquire a time-resolved image and time-resolved data (time dependence data) of the light emission intensity at high speed with high accuracy, and it is possible to measure light emission data of light emission unique to the state of the object to be inspected with high accuracy.

In the above aspect, the determination unit may read reference light emission data of the object to be inspected, which is stored in advance in a storage unit, and determine the state of the object to be inspected by using the reference light emission data that has been read and the light emission data measured by the measurement unit.

According to this aspect, the object to be inspected is irradiated with the excitation light, under the predetermined irradiation condition and, by using the light emission data of the light emission from the object to be inspected which is generated according to the irradiation with the excitation light and the reference light emission data of the object to be inspected which is stored in advance in the storage unit, it is possible to determine the state of the object to be inspected.

A state determination device according to an aspect of the present invention includes: an irradiation unit which irradiates an object to be inspected with excitation light under a predetermined irradiation condition; a measurement unit which measures first light emission data as light emission data of light emission from the object to be inspected, which is generated according to the irradiation with the excitation light, and measures second light emission data as light emission data of light emission from the object to be inspected, which is generated according to the irradiation with the excitation light after an external factor of the object to be inspected is changed; and a determination unit which determines a state of the object to be inspected based on the change of the external factor of the object to be inspected on a basis of a change degree of the second light emission data relative to the first light emission data.

According to this aspect, each of the object to be inspected before processing and the object to be inspected after the processing is irradiated with the excitation light under the predetermined irradiation condition and, based on a change amount of light emission data of the object to be inspected after the processing with respect to light emission data of the object to be inspected before the processing, it is possible to determine the state of the object to be inspected.

In the above aspect, the determination unit may determine, as the state of the object to be inspected, a degree of deterioration of the object to be inspected by checking light emission data of each deterioration degree of the object to be inspected, which is stored in advance in a storage unit, against the light emission data measured by the measurement unit.

According to this aspect, the object to be inspected is irradiated with the excitation light under the predetermined irradiation condition and, based on the light emission data of the light emission from the object to be inspected which is generated with a delay with respect to the irradiation with the excitation light, it is possible to determine the degree of the deterioration of the object to be inspected.

In the above aspect, a wavelength of the excitation light may be not less than 10 nm.

According to this aspect, by using the excitation light having a wavelength of not less than 10 nm, as compared with the case where the excitation light having a wavelength of less than 10 nm is used, it is possible to simplify not only management of safety in the case where the object to be inspected is irradiated with the excitation light but also management of power supply control, and it is possible to suppress operation cost of the state determination device to a low level.

In the above aspect, the light emission data may include light emission data of delayed fluorescence and or phosphorescence, which is generated after the irradiation with the excitation light is stopped.

According to this aspect, by measuring the light emission data of the delayed fluorescence and or the phosphorescence unique to the state of the object to be inspected, it is possible to determine the state of the object to be inspected.

A state determination method according to an aspect of the present invention includes: an irradiation step of irradiating an object to be inspected with excitation light under a predetermined irradiation condition; a measurement step of measuring light emission data of light emission from the object to be inspected, which is generated with a delay with respect to the irradiation with the excitation light; and a determination step of determining a state of the object to be inspected by checking the light emission data against light emission data of light emission from the object to be inspected which is measured in a case where the excitation light is emitted under an irradiation condition common to the light emission data for each state of a substance constituting the object to be inspected.

According to this aspect, the object to be inspected is irradiated with the excitation light under the predetermined irradiation condition and, based on the light emission data of the light emission from the object to be inspected which is generated with a delay with respect to the irradiation with the excitation light it is possible to determine the state of the object to be inspected.

In the above aspect, in the determination step, reference light emission data of the object to be inspected, which is stored in advance in a storage unit may be read, and the state of the object to be inspected may be determined by using the reference light emission data that has been read and the light emission data that has been measured.

According to this aspect, the object to be inspected is irradiated with the excitation light under the predetermined irradiation condition and, by using the light emission data of the light emission from the object to be inspected which is generated according to the irradiation with the excitation light and the reference light emission data of the object to be inspected which is stored in advance in the storage unit, it is possible to determine the state of the object to be inspected.

A state determination program according to an aspect of the present invention causes a computer to execute: processing of irradiating an object to be inspected with excitation light under a predetermined irradiation condition; processing of measuring light emission data of light emission from the object to be inspected, which is generated with a delay with respect to the irradiation with the excitation light; and processing of determining a state of the object to be inspected by checking the light emission data against light emission data of light emission from the object to be inspected, which is measured in a case where the excitation light is emitted under an irradiation condition common to the light emission data for each state of a substance constituting the object to be inspected.

According to this aspect, the object to be inspected is irradiated with the excitation light under the predetermined irradiation condition and, based on the light emission data of the light emission from the object to be inspected which is generated with a delay with respect to the irradiation with the excitation light, it is possible to determine the state of the object to be inspected.

A state determination device according to an aspect of the present invention includes: an irradiation unit which irradiates an object to be inspected with excitation light under a predetermined irradiation condition; a measurement unit which measures light emission data related to light emission of the object to be inspected, which is generated with a delay with respect to the irradiation with the excitation light, and a determination unit which determines a state of the object to be inspected based on the light emission data and light emission data related to light emission, which is generated with a delay in a case where the excitation light is emitted under the predetermined irradiation condition for each state of a substance constituting the object to be inspected.

According to this aspect, the object to be inspected is irradiated with the excitation light under the predetermined irradiation condition and, based on the light emission data related to the light emission which is generated with a delay with respect to the irradiation with the excitation light, it is possible to determine the state of the object to be inspected.

Advantageous Effects of Invention

According to the present invention, it is possible to determine the state of the object to be inspected by using light.

DESCRIPTION OF EMBODIMENTS

First Embodiment

Figure 1:
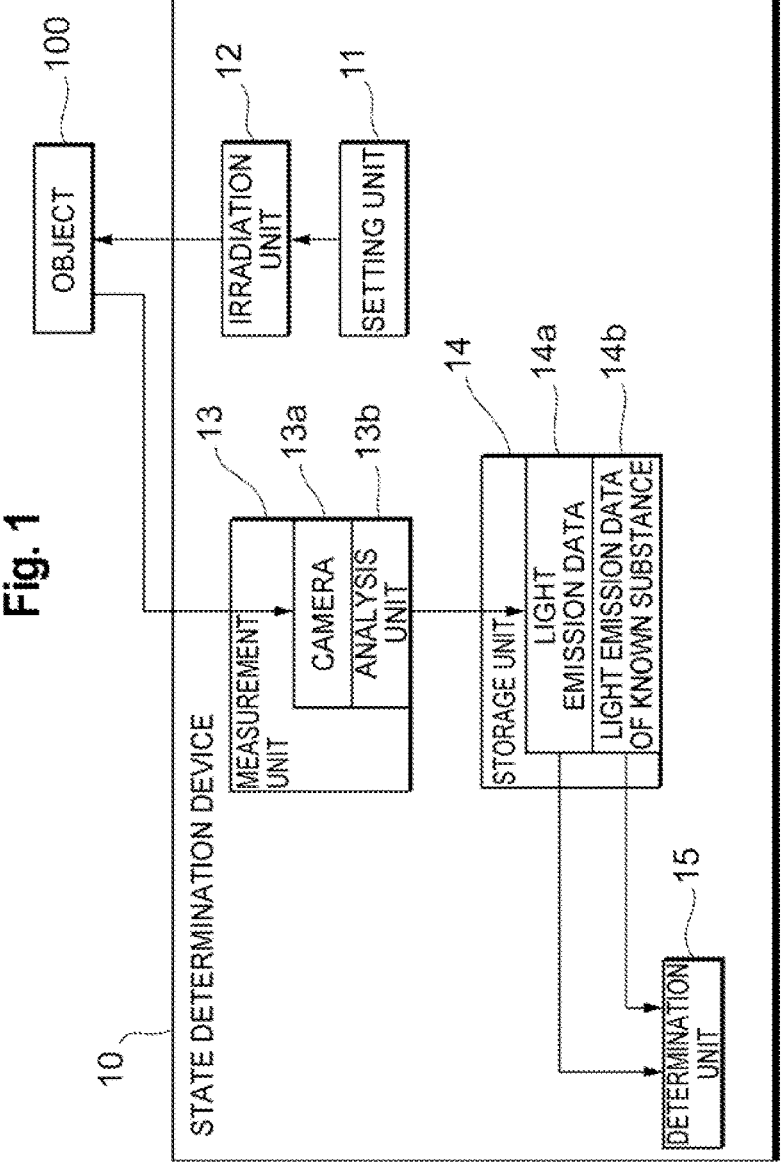
FIG. 1 is a view showing a functional block of a state determination device according to a first embodiment of the present invention.

Hereinbelow, a first embodiment according to an aspect of the present invention will be described based on the drawings. Note that, in the individual drawings, elements designated by the same reference numerals have the same or similar configurations.

FIG. 1 is a view showing a functional block of a state determination device 10 according to the first embodiment. The state determination device 10 includes a setting unit 11, an irradiation unit 12, a measurement unit 13, a storage unit 14, and a determination unit 15. The state determination device 10 irradiates an object to be inspected 100 with excitation light under any irradiation condition, and determines the state of a substance constituting the object to be inspected 100 based on light emission data of delayed fluorescence and/or phosphorescence which is generated according to the irradiation with the excitation light. The state of the substance changes with addition of an external factor to the object to be inspected 100 in an unprocessed (initial) state. The state of the substance may be the state of the substance which is once changed by addition of the external factor to the object to be inspected 100 in the unprocessed state and is changed again by further addition of external action to the object to be inspected 100.

The object to be inspected 100 may be an object constituted by any substance. The object to be inspected 100 may be a gas, a liquid or a solid, may be an inorganic or organic substance, and may include, e.g., paper, concrete, powder, resin, or a plant. Examples of the state of the object to be inspected 100 changed by addition of the external factor include a state in which water serving is added to the object to be inspected 100, a state in which a pH (acidity, basicity (alkaline)) is different, a state in which an electromagnetic wave is applied to the object to be inspected 100, a state in which the object to be inspected 100 is heated, a state in which the object to be inspected 100 is exposed to air and various gases, and a state in which mechanical stress is applied to the object to be inspected 100. In addition, combinations of the above external factors are common in a natural environment, and hence these external factors may be combined. The state determination device 10 can determine the state of the object to be inspected 100 in noncontact, nondestructive, and noninvasive manners based on light emission data which is measured in advance for each state of the substance constituting the object to be inspected 100.

The setting unit 11 sets an irradiation condition of excitation light. The irradiation condition of the excitation light includes at least any of the wavelength of the excitation light, the intensity of the excitation light, and irradiation time of the excitation light. For example, the wavelength of the excitation light may be from 200 nm to 400 nm in an ultraviolet range, but may also be not more than 200 nm in a far ultraviolet range and may be not less than 400 nm in a visible light range. In addition, as the wavelength of the excitation light is shorter (i.e., energy intensity is higher), the light emission lifetime of delayed fluorescence and f or phosphorescence tends to be longer, and hence, in the case where the light emission lifetime is used in the determination of the state of the substance, the wavelength of the excitation light may be set to be relatively short. In addition, as the intensity of the excitation light is higher, the light emission lifetime of the delayed fluorescence and/or the phosphorescence tends to be longer, and hence, in the case where the light emission lifetime is used in the determination of the state of the substance, the intensity of the excitation light may be set to be relatively high. Further, as the irradiation time of the excitation light is longer, the light emission lifetime of the delayed fluorescence and/or the phosphorescence tends to be longer, and hence, in the case where the light emission lifetime is used in the determination of the state of the substance, the irradiation time of the excitation light may be set to be relatively long. Note that there are cases where the light emission lifetime of the delayed fluorescence and/or the phosphorescence does not change even when the irradiation time of the excitation light is set to be equal to or longer than a predetermined time period, and hence the irradiation time of the excitation light may be set to, among time periods with which the light emission lifetime of the delayed fluorescence and/or the phosphorescence has a value close to the maximum value, the shortest time period. By setting the irradiation condition including at least any of the wavelength of the excitation light, the intensity of the excitation light, and the irradiation time of the excitation light, it is possible to measure the light emission data of the delayed fluorescence and/or the phosphorescence by emitting the excitation light under various conditions, and it is possible to measure the light emission data unique to the state of the substance and determine the state of the substance with high accuracy.

The irradiation unit 12 irradiates the object to be inspected 100 with the excitation light under the irradiation condition set by the setting unit 11. The irradiation unit 12 may be constituted by, e.g., an ultraviolet laser or an ultraviolet LED (Light Emitting Diode). In addition, the wavelength of the excitation light emitted by the irradiation unit 12 may be not less than 10 nm. By using the excitation light having a wavelength of not less than 10 nm, as compared with the case where the excitation light having a wavelength of less than 10 nm is used, it is possible to simplify not only management of safety in the case where the object to be inspected 100 is irradiated with the excitation light but also management of power supply control, and it is possible to suppress operation cost of the state determination device 10 to a low level.

The measurement unit 13 measures light emission data related to light emission of the object to be inspected 100 which is generated with a delay with respect to the irradiation with the excitation light. More specifically, the measurement unit 13 measures the light emission data of the delayed fluorescence and or the phosphorescence from the object to be inspected 100 which is generated according to the irradiation with the excitation light. Note that the light emission of the object to be inspected 100 which is generated with a delay with respect to the irradiation with the excitation light is not limited to the delayed fluorescence and/or the phosphorescence, and may include another delayed light emission, afterglow, or luminescence. Note that, in the present description, the delayed fluorescence includes a short phenomenon in which the lifetime of light emission having started immediately after stopping of the irradiation with the excitation light is about several nanoseconds, as well as a phenomenon in which the light emission having started immediately after stopping of the irradiation with the excitation light continues for a long time period. In addition, the phosphorescence is a phenomenon in which light emission having started immediately after stopping of the irradiation with the excitation light continues for a predetermined time period, and includes light emission having the lifetime of the light emission of about $10^{-3}$ to 10 seconds. The measurement unit 13 includes a camera 13a and an analysis unit 13b. The camera 13a photographs the delayed fluorescence and/or the phosphorescence from the object to be inspected 100 which is generated according to the irradiation with the excitation light. The camera 13a may be a high speed camera which photographs the delayed fluorescence and/or the phosphorescence at a frame rate of not less than 100 fps. The frame rate of the high speed camera may also be 1000 fps or not less than 10000 fps. With the use of the high speed camera, by applying the high speed camera to a phenomenon in which the light emission intensity of the delayed fluorescence and/or the phosphorescence immediately after the irradiation with the excitation light is sharply attenuated, for the first time, it is possible to acquire a time-resolved image and time dependence data of the light emission intensity at high speed with high accuracy, and it is possible to measure the light emission data of the delayed fluorescence and/or the phosphorescence unique to the substance with high accuracy. In the case where the delayed fluorescence and/or the phosphorescence from the object to be inspected 100 is photographed with the high speed camera, an image in which light is multiplied by an image intensifier may be photographed. In addition, adjacent pixels may be treated as one pixel by a binning function, and an image of the delayed fluorescence and/or the phosphorescence may be photographed with improved sensitivity. Further, exposure time may be changed dynamically according to the light intensity of the object to be inspected 100. In this case, by setting the exposure time of the camera 13a to a long time period, it is possible to detect the delayed fluorescence and/or the phosphorescence from the object to be inspected 100 having lower light emission intensity. Note that, in order to secure the function of high-speed imaging of the camera 13a, the upper limit (e.g., 10 ms) may be set for the exposure time of the camera 13a. In addition, an image having an improved S/N ratio ay be generated by performing contraction processing or expansion processing on a photographed image. Note that, in the case where the delayed fluorescence and or the phosphorescence from the object to be inspected 100 is photographed with the high speed camera, the intensity of the excitation light may be increased according to the frame rate. Further, by using the camera 13a, it becomes possible to measure the delayed fluorescence and or the phosphorescence from the object to be inspected 100 on two-dimensional or three-dimensional coordinates, With this, it is possible to determine a coordinate position with high resolution based on a pixel array, and determine the state of the substance constituting the object to be inspected 100 according to each coordinate position. Accordingly, as compared with conventional fluorescence lifetime measurement, high-speed measurement is made possible. Thus, the device of the present invention has an advantage that it is possible to measure time dependence data of the delayed fluorescence or phosphorescence intensity with high time resolution (e.g., every 0.01 milliseconds to 10 milliseconds) by the irradiation with the excitation light to the object to be inspected 100 for a short time period (e.g., 0.01 milliseconds to 500 milliseconds). In addition, in the device of the present invention, the delayed fluorescence and/or the phosphorescence is photographed with exposure for a short time period, and hence the device of the present invention has a feature in which the device of the present invention can be used in a situation in which the object to be inspected 100 moves between imaging frames or a situation in which a motion blur occurs with the exposure for a long time period.

Note that, in the case where aging deterioration of a sensor of the camera 13*a* or the substance serving as a measurement target has occurred, it is considered that it becomes difficult to determine the state of the substance at the time of the aging deterioration unless a factor for the aging deterioration is eliminated. To cope with this, it is preferable to perform, in advance, calibration which allows conversion between the luminance value of the camera 13*a* and a physical quantity (e.g., illumination or the like) in order to handle the luminance value of an image obtained by the camera 13*a* as an absolute value (physical quantity). For example, the calibration may be performed after a correction parameter in which an influence of the aging deterioration is considered is set by combining, e.g., a calibrated illuminometer or luminance meter and a calibration board of paper which is not subjected to the aging deterioration, and the luminance value of the camera 13*a* is corrected by using the set correction parameter.

The analysis unit 13*b* analyzes the light emission data of the delayed fluorescence and/or the phosphorescence from the object to be inspected 100 based on the image photographed by the camera 13*a*. Herein, the light emission data may include light emission data of the delayed fluorescence and or the phosphorescence which is generated after the irradiation with the excitation light is stopped. Note that the light emission data may also include light emission data of the delayed fluorescence and/or the phosphorescence which is generated during the irradiation with the excitation light. It is possible to determine the state of the substance by using only the light emission data of the delayed fluorescence and or the phosphorescence which is generated after the irradiation with the excitation light is stopped without using the light emission data of the delayed fluorescence and or the phosphorescence which is generated during the irradiation with the excitation light.

In addition, the light emission data may include at least any of time dependence data of the light emission intensity and a time-attenuation curve of the light emission intensity which are determined from the luminance distribution of the image photographed by the camera 13*a*. Examples of the time dependence data of the light emission intensity and the time-attenuation curve of the light emission intensity will be described in detail by using FIGS. 3 to 8. For the delayed fluorescence and/or the phosphorescence, by measuring at least any of the time dependence data of the light emission intensity and the time-attenuation curve of the light emission intensity, it is possible to measure the light emission data which characterizes the substance and determine the state of the substance with high accuracy.

In addition, the measurement unit 13 may measure light emission data including data related to the fluorescence of the object to be inspected 100 which is generated during the irradiation with the excitation light. That is, the measurement unit 13 may measure not only the light emission data of the delayed fluorescence and/or the phosphorescence from the object to be inspected 100 but also data related to usual fluorescence. In this case, the light emission data includes data related to the fluorescence and data related to the delayed fluorescence and or the phosphorescence. Thus, by measuring the light emission data including the data related to not only the delayed fluorescence and or the phosphorescence but also the fluorescence, it is possible to determine the state of the substance.

The storage unit 14 stores light emission data 14*a* of the delayed fluorescence and or the phosphorescence which is measured in the case where the object to be inspected 100 is irradiated with the excitation light under a given irradiation condition, and light emission data 14*b* of the delayed fluorescence and/or the phosphorescence which is measured for each of various states of various substances in the case where known substances are irradiated with the excitation light under one or a plurality of irradiation conditions. The light emission data 14*a* and the light emission data 14*b* may be acquired from a new or unprocessed object to be inspected 100, or may also be acquired from the object to be inspected 100 to which an external factor is applied. For example, in the case where the light emission data 14*a* is data acquired from the new or unprocessed object to be inspected 100, data acquired from the object to be inspected 100 to which the external factor is applied is used as the light emission data 14*b*, In this case, examples of the case include a food manufacturing process and a component manufacturing process. In addition, in the case where the light emission data 14*a* is data acquired from the object to be inspected 100 to which the external factor is applied, data acquired from the new or unprocessed object to be inspected 100 is used as the light emission data 14*b*. In this case, an example of the case includes inspection of a tunnel or a bridge. Further, in the case where the state of the object to be inspected 100 to which the external factor is being applied is determined in real time, data acquired from the object to be inspected 100 to which the external factor is being applied is used as the light emission data 14*a*, and data acquired from the new or unprocessed object to be inspected 100, or data which is acquired previously from the object to be inspected 100 to which the external factor is applied is used as the light emission data 14*b*. In this case, examples of the case include the food manufacturing process, the component manufacturing process, and a mixing process of liquid or power.

The determination unit 15 determines the state of the substance constituting the object to be inspected 100 based on the light emission data 14*a* which is measured in the case where the object to be inspected 100 is irradiated with the excitation light under a given irradiation condition, and the light emission data 14*b* of the delayed fluorescence and/or the phosphorescence which is measured in the case where the known substance is irradiated with the excitation light under the same irradiation condition. More specifically, after the type of the object to be inspected 100 is specified first, the light emission data 14*a* which is measured in the case where the object to be inspected 100 is irradiated with the excitation light under a given irradiation condition is checked against the light emission data 14*b* of the delayed fluorescence and or the phosphorescence which is measured in the case where the substance of the specified type is irradiated with the excitation light for each state of the substance under the same irradiation condition, and the state of the substance constituting the object to be inspected 100 is determined. Note that the type denotes labels with which substances constituting the object to be inspected 100 are roughly classified such as, e.g., papers (Type 1), resin (Type 2), and concrete (Type 3). The determination unit 15 determines the irradiation condition set by the setting unit 11, and determines the light emission data 14b of the known substance which is measured under an irradiation condition identical or closest to the determined irradiation condition. Subsequently, the determination unit 15 checks the light emission data 14a of the object to be inspected 100 against the light emission data 14b of the determined known substance, and determines the state of the substance constituting the object to be inspected 100 based on similarity of the light emission data.

For example, in the case where the substance is determined by using a light emission spectrum of the delayed fluorescence and/or the phosphorescence, by calculating a ratio between a width (which is, e.g., a half width) of a peak and a width (which is a width outside, e.g., the half width of the peak and is a width when 0.1% of peak intensity is reached) of a tail of a spectrum measured for the object to be inspected 100, and comparing the ratio therebetween with a ratio between the width of a peak and the width of a tail of a spectrum of the known substance, it is possible to perform checking having high robustness by using normalized light emission data.

The determination unit 15 may calculate an attenuation curve which approximates the time-attenuation curve of the light emission intensity based on the time-attenuation curve of the light emission intensity of the delayed fluorescence or the phosphorescence which is obtained by irradiating the object to be inspected 100 with the excitation light having a predetermined wavelength. For example, the determination unit 15 may approximate the time-attenuation curve of the light emission intensity as a function represented by $I(t)=I_0 \exp(-t/\tau)$, and determine $I_0$ and $\tau$ which are coefficients of the function by, e.g., the least squares method. Note that $I_0$ is a coefficient representing the light emission intensity when excitation is stopped, and $\tau$ is a coefficient representing the light emission lifetime of the delayed fluorescence or the phosphorescence. The determination unit 15 may determine the state of the substance constituting the object to be inspected 100 by using, e.g., the light emission lifetime calculated from the time-attenuation curve of the light emission intensity. In addition, the determination unit 15 may determine the state of the substance constituting the object to be inspected 100 by, e.g., comparing a half decay period $\tau/2$ of the light emission related to the object to be inspected 100 with the half decay period of the light emission related to the known substance. Note that, in general, the determination unit 15 may approximate the time-attenuation curve of the light emission intensity as a function represented by $I(t)=\Sigma_{j=1}^{N} I_j \exp(-t/\tau_j)$ and determine $I_j$ and $\tau_j$ which are coefficients of the function by, e.g., the least squares method. Herein, N is an integer of not less than 1. Thus, by approximating the time-attenuation curve of the light emission intensity by using a plurality of exponential functions, it is possible to approximate the time-attenuation curve with high accuracy.

The determination unit 15 may determine the state of the substance constituting the object to be inspected 100 by calculating, for the light emission spectrum of the delayed fluorescence or the phosphorescence obtained by irradiating the object to be inspected 100 with the excitation light having a single wavelength, a ratio between the light emission intensities of the delayed fluorescence or the phosphorescence at different wavelengths. That is, the determination unit 15 may determine the state of the substance constituting the object to be inspected 100 by utilizing relative values of the light emission intensity of the delayed fluorescence or the phosphorescence at different wavelengths. For example, the determination unit 15 may determine the state of the substance constituting the object to be inspected 100 by comparing a ratio $I(\lambda 1)/I(\lambda 2)$ between a light emission intensity $I(\lambda 1)$ at a first wavelength $\lambda 1$ and a light emission intensity $I(\lambda 2)$ at a second wavelength $\lambda 2$ which are measured for the object to be inspected 100 with a ratio $I(\lambda 1)/I(\lambda 2)$ between light emission intensities measured for the known substance. Examples of a method for acquiring the ratio between the light emission intensities of the delayed fluorescence or the phosphorescence at different wavelengths include a method in which RGB pixel values acquired by a color camera are used as parameters obtained through color filters, a method in which a pixel value obtained by attaching a bandpass filter to a monochrome camera is used, and a method in which a hyperspectral camera is used. In addition, the determination unit 15 may determine the state of the substance constituting the object to be inspected 100 by calculating a difference in the peak wavelength and a peak intensity ratio of the light emission spectrums obtained by emitting the excitation lights having different wavelengths, and comparing the difference in the peak wavelength and the peak intensity ratio with the difference in the peak wavelength and the peak intensity ratio of the light emission spectrums of the known substance. Further, in the case where the determination unit 15 determines the state of the substance by using the light emission lifetime of the delayed fluorescence and/or the phosphorescence, it is possible to perform checking having high robustness by determining the intensity of the excitation light at which the light emission lifetime is saturated for the object to be inspected 100, and comparing the intensity of the excitation light with the intensity of the excitation light at which the light emission lifetime is saturated for the known substance.

The determination unit 15 may input the light emission data 14a which is measured in the case where the object to be inspected 100 is irradiated with the excitation light under a given condition into a learning model such as a neural network, and may determine which one of pieces of the light emission data 14b in different states in the known substance the light emission data 14a is similar to with the learning model. In this case, the learning model may be generated by supervised learning which uses various pieces of light emission data as learning data, or may also be generated by unsupervised learning such as clustering. Herein, the learning model, the learning data, the light emission data 14a, and the light emission data 14b of the known substance only need to be accessible via a communication network, and do not necessarily need to be stored in the storage unit of the state determination device 10.

Thus, according to the state determination device 10 according to the first embodiment, it is possible to determine the state of the substance based on the light emission data of the delayed fluorescence and or the phosphorescence which is generated according to the irradiation of the object to be inspected 100 with the excitation Tight under any irradiation condition which is performed after the type of the object to be inspected 100 is specified in advance, and the light emission data of the delayed fluorescence and/or the phosphorescence which is measured under the same irradiation condition for the substance of the type specified in advance.

For example, it is assumed that the object to be inspected 100 has a uniform appearance with visible light. Under such a condition, when the determination of the state of the substance constituting the object to be inspected 100 is performed with fluorescence, visible light, and infrared light, there are cases where it is not possible to determine the state of the substance. On the other hand, when it is assumed that the object to be inspected 100 has a characteristic which differs from one state to another, and has the light emission spectrum or the light emission lifetime of the delayed fluorescence and/or the phosphorescence which differs from one state to another in the light emission phenomenon of the delayed fluorescence and/or the phosphorescence, it becomes possible to determine the state of the substance by using the information. For example, in the case where water is added to the substance, there are cases where the light emission spectrum and the light emission lifetime of the delayed fluorescence and/or the phosphorescence become different from those before water is added to the substance. In addition, in the case where the substance is heated, there are cases where the light emission spectrum and the light emission lifetime of the delayed fluorescence and/or the phosphorescence become different from those before the substance is heated. In addition, in the case where properties of the substance deteriorate, there are cases where the light emission spectrum and the light emission lifetime of the delayed fluorescence and/or the phosphorescence become different from those before the properties of the substance deteriorate. Incidentally, when heated papers are analyzed with FT-IR, an absorption peak is seen in the vicinity of 1730 cm$^{-1}$ derived from CO=O bond (C=O stretching), and hence it is suggested that cellulose skeletons of papers are oxidized and are caused to deteriorate. In addition, depending on the substance constituting the object to be inspected 100, it is known that, in deterioration by hydrolysis, absorption derived from a specific functional group such as, e.g., —OH bond is observed, and it is known that, particularly in resins, absorption derived from —NH$_2$ bond or —COOH bond is observed. Accordingly, the deterioration of the substance may be examined by focusing attention on these bond formations and a phenomenon in which the bond formation is increased. Note that the deterioration of the substance denotes that properties of the substance change non-continuously with continuation of addition of an external factor to the substance. In general, the deterioration of the substance denotes that properties of the substance change irreversibly, but may include reversible change of properties of the substance.

In addition, according to the state determination device 10 according to the first embodiment, by irradiating the object to be inspected 100 with the excitation light, it is possible to determine the state of the object to be inspected 100 in noncontact, nondestructive, and noninvasive manners. Accordingly, for example, the state determination device 10 can detect a product which has contained water by mistake when products having the same characteristics are conveyed by a belt conveyer as a product having an abnormality. In addition, for example, when products having the same characteristics are heated in an oven, in the case where variations have occurred in the transmission of heat inside the oven, the state determination device 10 can detect a product affected by variations in heating as a product having an abnormality.

Further, according to the state determination device 10 according to the first embodiment, even in a situation in which the object to be inspected 100 is moving, it is possible to detect the state of the object to be inspected 100. Accordingly, for example, during running of a vehicle on which the state determination device 10 is mounted, the state determination device 10 can detect an abnormality of a tunnel or a bridge and perform inspection. Further, the state determination device 10 has high-speed image processing capability and robustness. Accordingly, the state determination device 10 can also estimate the number of years of durability (life) of a structure by attaching a telephoto lens or a wide-angle lens to the camera 13a and performing fixed point observation or moving observation of a light emission image of a structure with a distant dam, bridge, breakwater or high building serving as a target.

Figure 2:
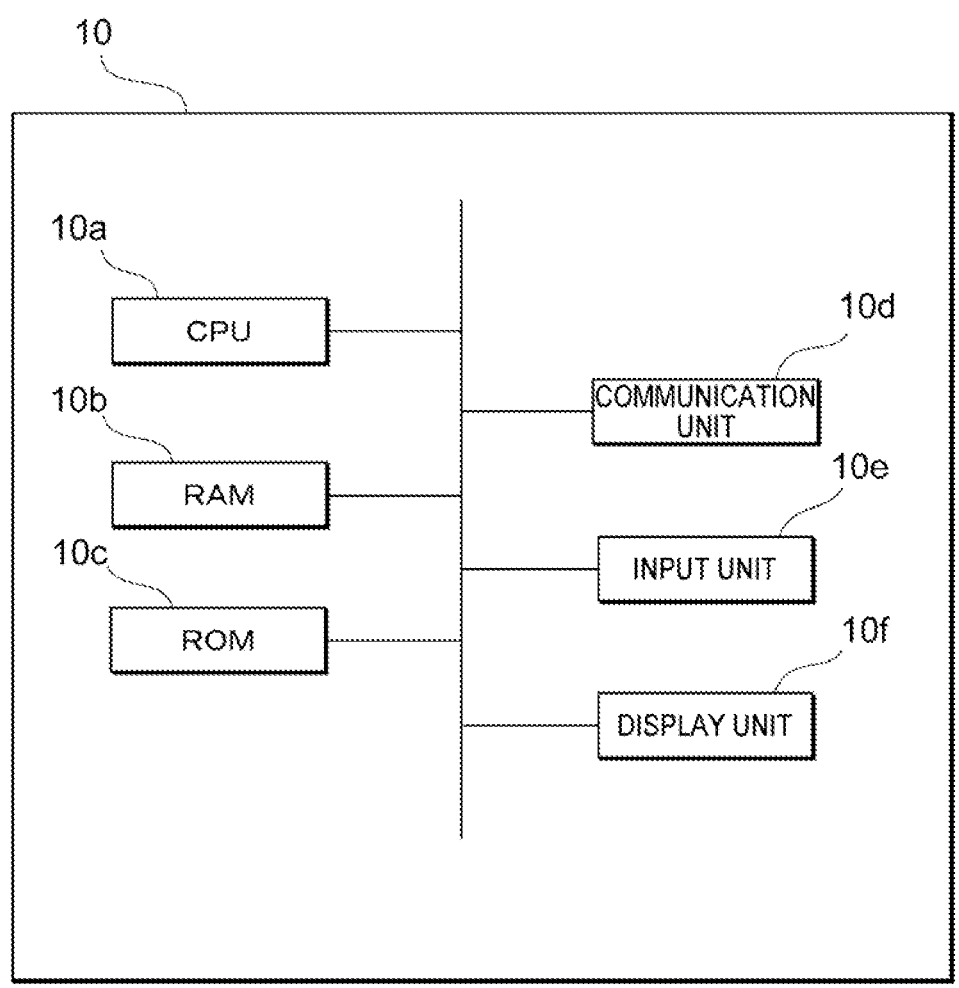
FIG. 2 is a view showing a physical configuration of the state determination device according to the first embodiment.

FIG. 2 is a view showing the physical configuration of the state determination device 10 according to the first embodiment. The state determination device 10 has a CPU (Central Processing Unit) 10a corresponding to an arithmetic calculation unit, a RAM (Random Access Memory) 10b corresponding to a storage unit, a ROM (Read Only Memory) 10c corresponding to a storage unit, a communication unit 10d, an input unit 10e, and a display unit 10f. These individual configurations are configured to be capable of mutual transmission and reception of data via a bus. Note that, in the present example, a description will be given of the case where the state determination device 10 is constituted by one computer, but the state determination device 10 may also be implemented by combining a plurality of computers. In addition, the configurations shown in FIG. 2 are only examples, and the state determination device 10 may have a configuration other than the above configurations, or does not need to have part of the configurations.

The CPU 10a is a control unit which performs control related to execution of a program stored in the RAM 10b or the ROM 10c, and arithmetic calculation and processing of data. The CPU 10a is an arithmetic calculation unit which executes a program (state determination program) which determines the substance based on the light emission data. The CPU 10a receives various pieces of data from the input unit 10e and the communication unit 10d, and displays the arithmetic calculation result of the data in the display unit 10f or stores the arithmetic calculation result of the data in the RAM 10b or the ROM 10c.

The RAM 10b is one of the storage units which is capable of rewriting of data, and may be constituted by, e.g., a semiconductor storage element. The RAM 10b may store the state determination program executed by the CPU 10a, and the light emission data of the delayed fluorescence and/or the phosphorescence related to a plurality of substances. Note that these are only examples, and data other than the above data may be stored in the RAM 10b and part of the above data does not need to be stored in the RAM 10b.

The ROM 10c is one of the storage units which is capable of reading of data, and may be constituted by, e.g., a semiconductor storage element. The ROM 10c may store, e.g., the state determination program, and data which is not rewritten.

The communication unit 10d is an interface which connects the state determination device 10 to other equipment. The communication unit 10d may be connected to a communication network such as the Internet.

The input unit 10e receives input of data from, and may include, e.g., a keyboard and a touch panel.

The display unit 10f displays the arithmetic calculation result by the CPU 10a visually, and may be constituted by, e.g., an LCD (Liquid Crystal Display). The display unit 10f nay display a result of determination of the substance, and measured light emission data.

The state determination program may be provided after being stored in a computer-readable storage medium such as the RAM 10b or the ROM 10c, or may also be provided via a communication network connected by the communication unit 10d, in the state determination device 10, the CPU 10a executes the state determination program, and various operations described by using FIG. 1 are thereby implemented. Note that these physical configurations are only examples, and they don't necessarily need to be independent of each other. For example, the state determination device 10 may include an LSI (Large-Scale Integration) in which the CPU 10a, the RAM 10b, and the ROM 10c are integrated together.

Figure 3:
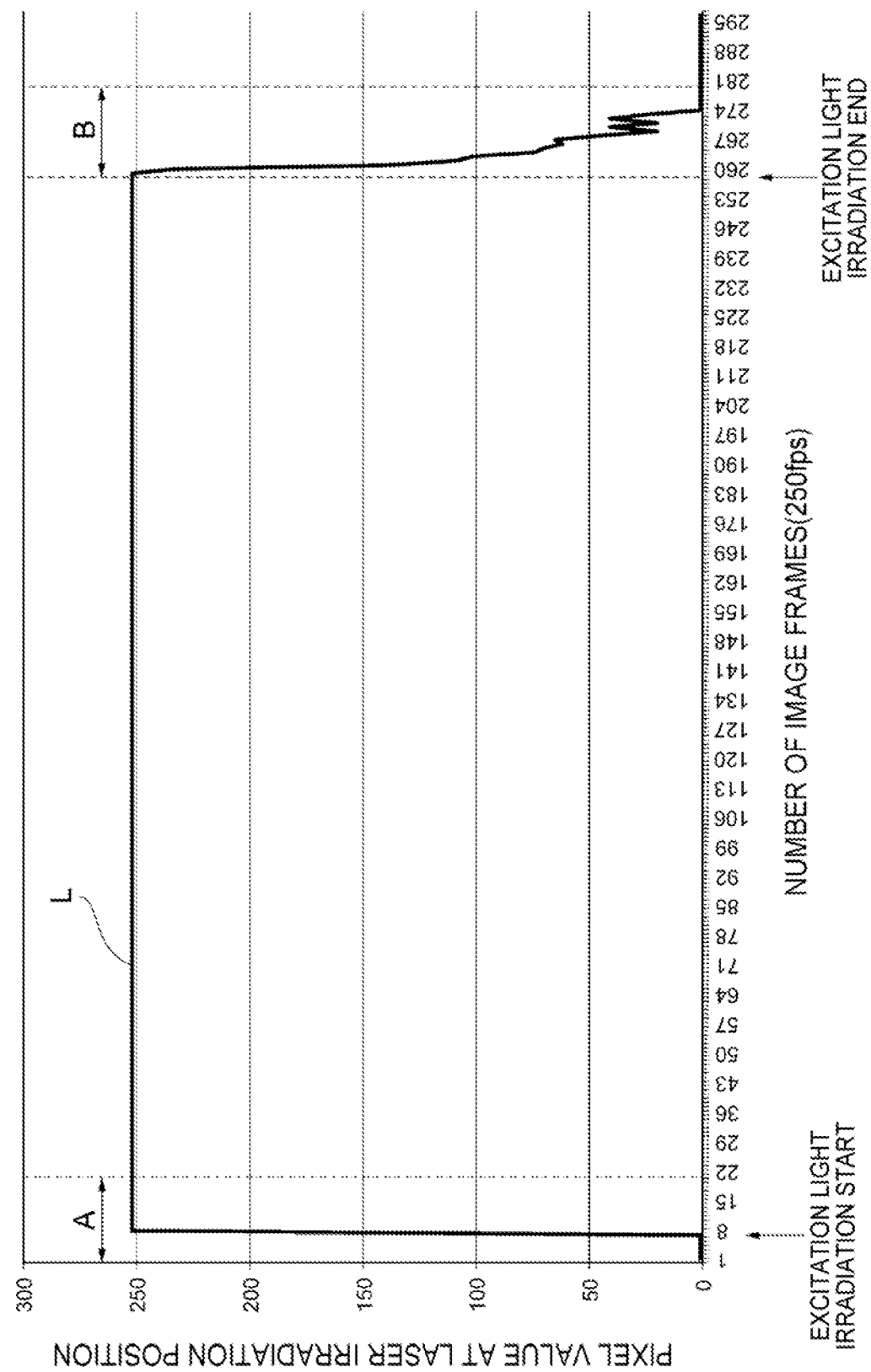
FIG. 3 is a view showing light emission data measured by the state determination device according to the first embodiment.

FIG. 3 is a view showing light emission data L measured by the state determination device 10 according to the first embodiment. In the light emission data L, plain paper serving as the object to be inspected 100 is irradiated with a laser having a specific wavelength which serves as the excitation light for 500 ms, images during irradiation and before and after the irradiation are photographed by the camera 13a (high speed camera) at 250 fps, and the pixel value of a pixel at center coordinates irradiated with the excitation light which is selected from pixels of the photographing result is represented in 8 bits (0 to 255). The horizontal axis in the drawing indicates the number of image frames which can be converted to the unit of ms by multiplying the numerical value of the horizontal axis by 4. In addition, the vertical axis in the drawing indicates the pixel value at the irradiation position of the laser serving as the excitation light, and the pixel value corresponds to a luminance value.

According to the light emission data. L, it can be seen that, immediately after the start of the irradiation with the excitation light, the pixel value reaches the maximum value (255), the pixel value is kept at the maximum value during the irradiation, the delayed fluorescence and/or the phosphorescence is emitted after the irradiation with the excitation light is ended, and the pixel value is gradually attenuated from the maximum value to the minimum value. In the following description, each of a first section A which represents the change of the pixel value before and after the start of the irradiation with the excitation light and a second section 6 which represents the change of the pixel value before and after the end of the irradiation with the excitation light will be described in detail.

Figure 4:
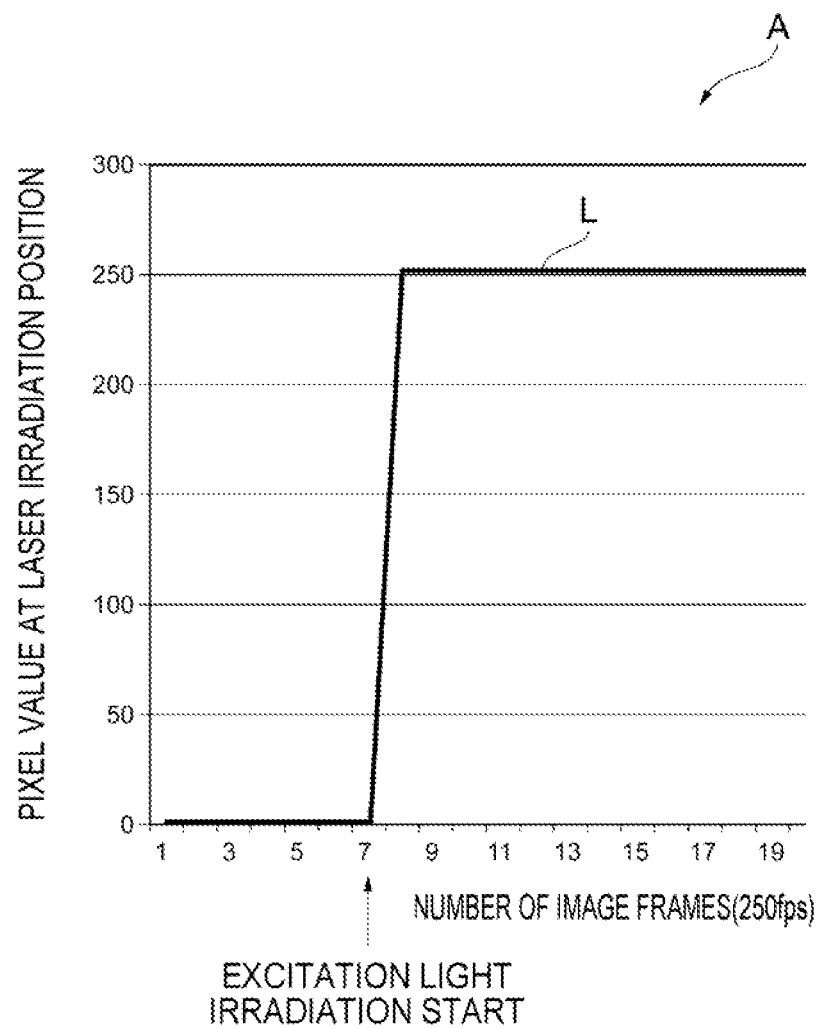
FIG. 4 is a view showing a first section of the light mission data measured by the state determination device according to the first embodiment.

FIG. 4 is a view showing the first section A of the light emission data L measured by the state determination device 10 according to the first embodiment. Also in the drawing, the horizontal axis indicates the number of image frames, and the vertical axis indicates the pixel value at the laser irradiation position.

According to the first section A of the light emission data L, the pixel value reaches the maximum value in about 1 frame (4 ms) from the start of the irradiation with the excitation light, and the pixel value becomes constant thereafter.

Figure 5:
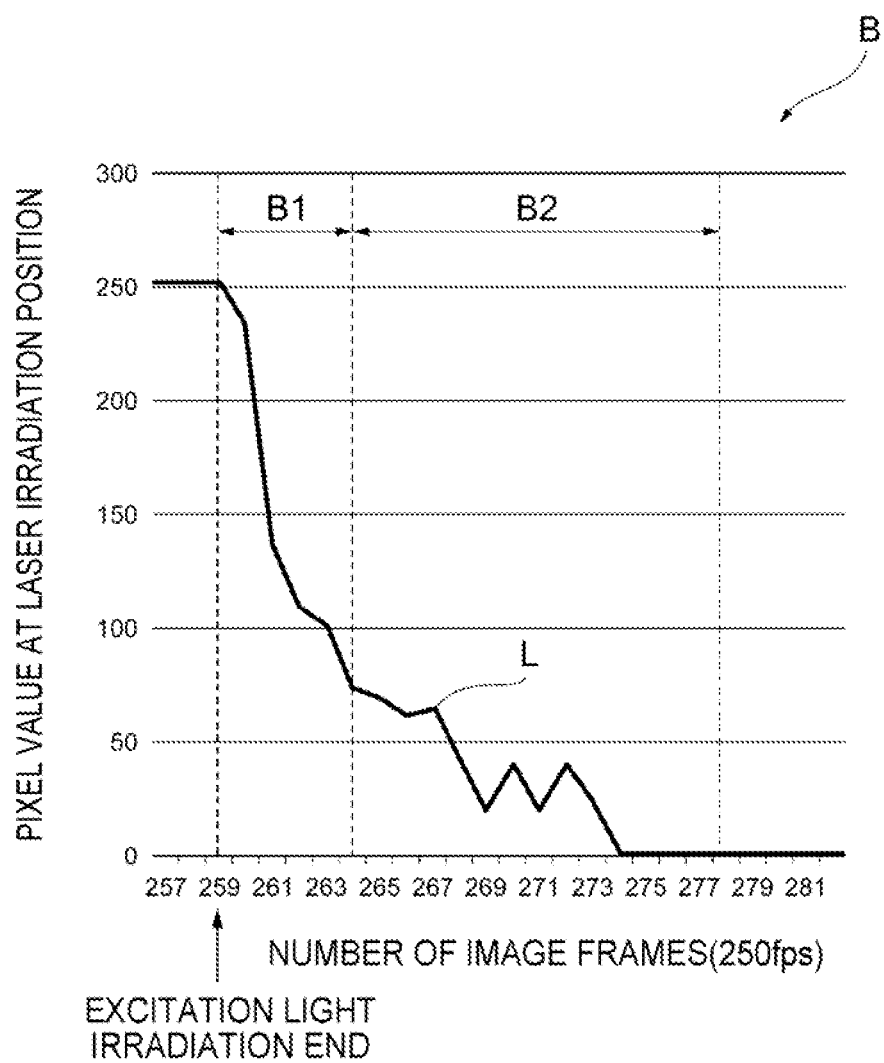
FIG. 5 is a view showing a second section of the light emission data measured by the state determination device according to the first embodiment.

FIG. 5 is a view showing the second section B of the light emission data L measured by the state determination device 10 according to the first embodiment. Also in the drawing, the horizontal axis indicates the number of image frames, and the vertical axis indicates the pixel value at the laser irradiation position.

The second section B of the light emission data L includes an exponential attenuation section B1 and a moderate attenuation section B2. When the irradiation with the excitation light is ended, the exponential attenuation section B1 starts immediately, and the pixel value is attenuated exponentially. In the case of the present example, the exponential attenuation section B1 continues for about 5 frames (20 ms) after the end of the irradiation with the excitation light and, during that time period, the pixel value is attenuated by about 70% from the maximum value.

Subsequently to the exponential attenuation section B1, the moderate attenuation section B2 continues for about 24 frames (96 ms) and, during that time period, the pixel value is attenuated to the minimum value.

In the present example, an image after the excitation light is emitted is photographed at 250 fps by one camera 13a, but the measurement unit 13 may include a camera which photographs the delayed fluorescence and/or the phosphorescence from the object to be inspected 100 at a frame rate of less than 100 fps, and a high speed camera, and the measurement unit 13 may photograph the delayed fluorescence and/or the phosphorescence during a time period in which temporal change is relatively fast with the high speed camera, and photograph the delayed fluorescence and/or the phosphorescence during a time period in which the temporal change is relatively slow with the camera. Herein, the time period in which the temporal change is relatively fast is, e.g., the exponential attenuation section B1, and the time period in which the temporal change is relatively slow is, e.g., the attenuation section B2. In this case, the high speed camera may be a camera which can image change of brightness of the order of 10 nsec, i.e., photograph an image at about $10^8$ fps. Thus, by using two cameras including the high speed camera and the relatively low speed camera, it is possible to photograph consecutive images with adequate time resolution in each of the time period in which the temporal change of the delayed fluorescence and/or the phosphorescence is relatively fast and the time period in which the temporal change thereof is relatively slow.

Note that, in the present example, the irradiation time of the excitation light is 500 ms, but this value can be set to any value. In the case where the object to be inspected 100 is plain paper, when the irradiation time of the excitation light is set to about 200 ms or longer, the lifetime of the delayed fluorescence and/or the phosphorescence tends to be saturated. Thus, the irradiation time of the excitation light applied to the object to be inspected 100 may be appropriately set so as to be not less than the irradiation time with which the lifetime of the delayed fluorescence and/or the phosphorescence is saturated.

Figure 6:
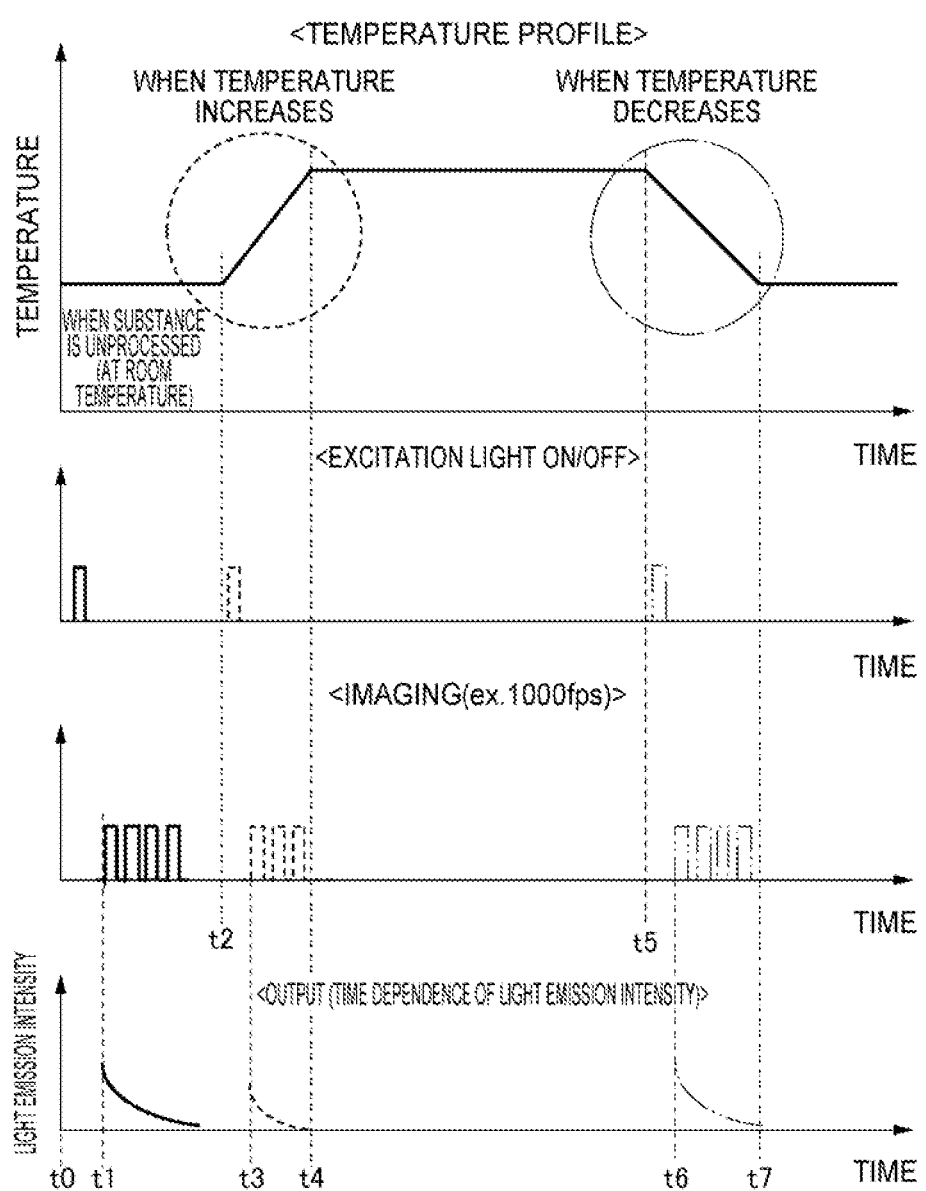
FIG. 6 is a view showing an example of time dependence of light emission intensity when the temperature of a substance increases and when the temperature thereof decreases.

FIG. 6 is a view showing an example of time dependence of the light emission intensity when the temperature of the substance increases and when the temperature of the substance decreases. As shown in FIG. 6, at time t1, the substance is unprocessed, and the temperature of the substance is substantially equal to room temperature. An increase in the temperature of the substance is started at time t2, and the increase in the temperature of the substance is stopped at time t4. A decrease in the temperature of the substance is started at time t5, and the decrease in the temperature of the substance is stopped at time t7. From time t0 to time t1, an output signal for turning ON the excitation light is output. From time t1 to time t2, imaging signals of the camera 13a are successively output. Subsequently, during a time period in which the substance is unprocessed, the time dependence of the light emission intensity in which the light emission intensity is gradually reduced from time t1 is observed based on a light emission image of the substance immediately after the irradiation with the excitation light. From time t2 to time t3, the output signal for turning ON the excitation light is output. From time t3 to time t4, the imaging signals of the camera 13a are successively output. Subsequently, when the temperature of the substance increases, the time dependence of the light emission intensity in which the light emission intensity is gradually reduced from time t3 is observed based on the light emission image of the substance immediately after the irradiation with the excitation light. From time t5 to time t6, the output signal for turning ON the excitation light is output. From time t6 to time t7, the imaging signals of the camera 13a are successively output. Subsequently, when the temperature of the substance decreases, the time dependence of the light emission intensity in which the light emission intensity is gradually reduced from time t6 is observed based on the light emission image of the substance immediately after the irradiation with the excitation light. Thus, the state determination device 10 can determine the state of the substance when the temperature of the substance increases and when the temperature thereof decreases in real time. In addition, it is also possible to use the state determination device 10 when water is absorbed and when stress is applied.

Figure 7:
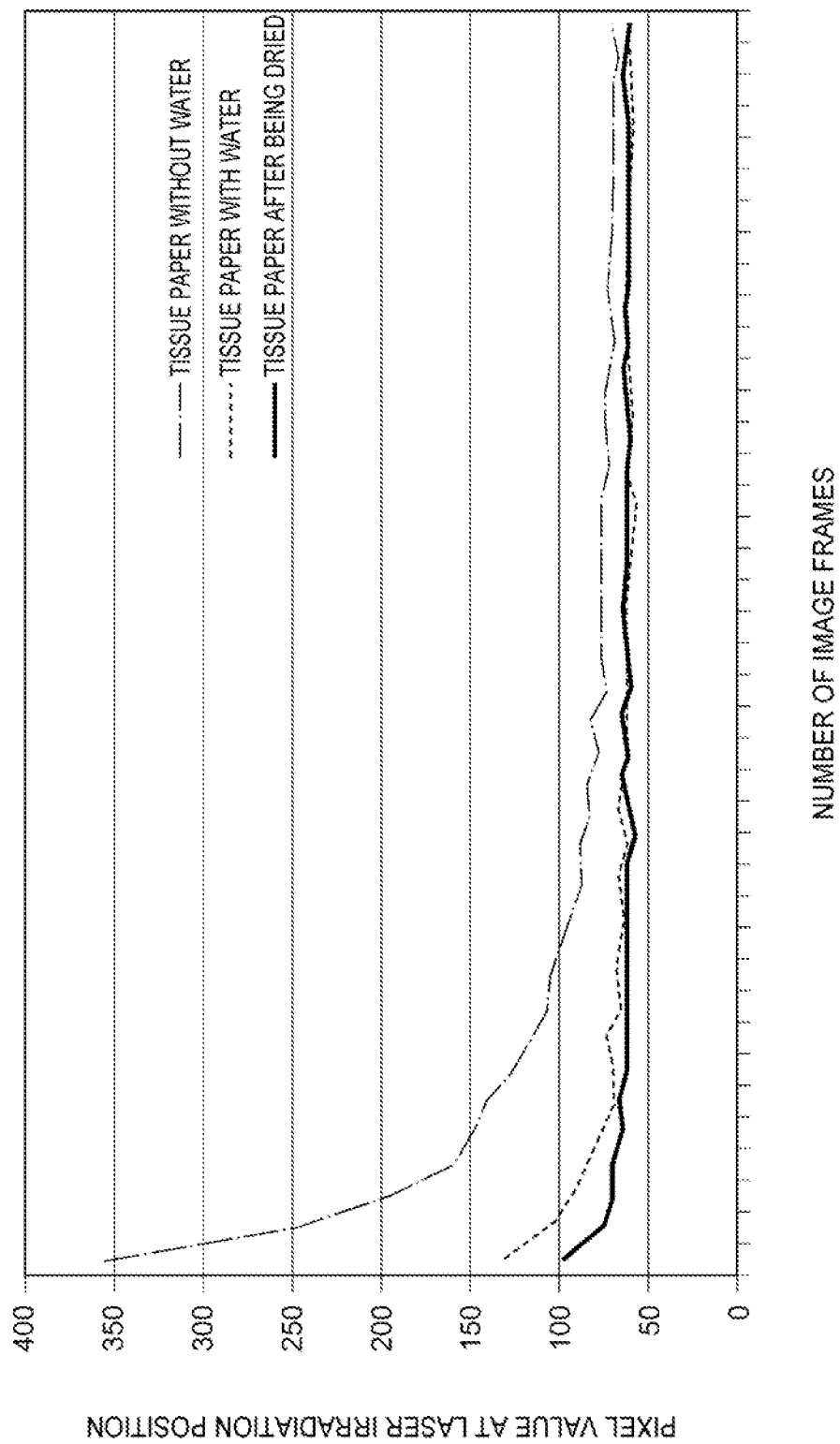
FIG. 7 is a view showing an example of the light emission data measured by the state determination device according to the first embodiment.

FIG. 7 is a view showing an example of the light emission data measured by the state determination device 10 according to the first embodiment. The light emission data is time dependence data of the light emission intensity of the delayed fluorescence and or the phosphorescence which is measured after tissue paper serving as an example of the object to be inspected 100 is irradiated with the excitation light. The drawing shows the time dependence data of the light emission intensity of the delayed fluorescence and/or the phosphorescence in each of a state in which water is not added to papers, a state in which water is added to the papers, and a state in which the papers are air-dried after water is added to the papers.

The determination unit 15 determines the state of the substance constituting the object to be inspected 100 by using, e.g., the shape of the time dependence data of the light emission intensity. In the case of the present example, in the case where water is added to the papers, the light emission intensity is lowered as compared with the light emission intensity before water is added to the papers. In addition, in the case of the present example, even when the papers are air-dried after water is added to the papers, the light emission intensity of the delayed fluorescence and/or the phosphorescence does not return to a level before water is added to the papers. The determination unit 15 determines whether or not water is added to the substance constituting the object to be inspected 100 by extracting characteristics of the shape of the time dependence data of the light emission intensity and comparing the extracted characteristics with characteristics of the shape of the time dependence data of the light emission intensity of the known substance.

Figure 8:
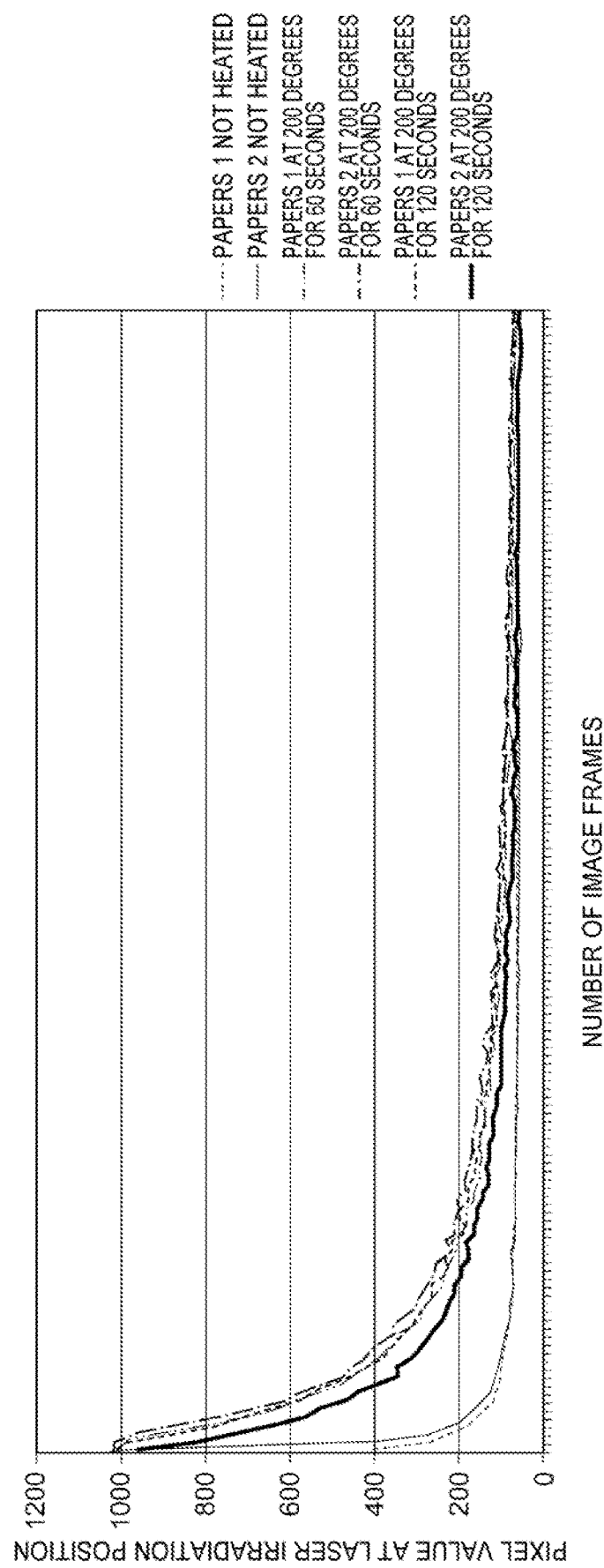
FIG. 8 is a view showing an example of the light emission data measured by the state determination device according to the first embodiment.

FIG. 8 is a view showing an example of the light emission data measured by the state determination device 10 according to the first embodiment. The light emission data is time dependence data of the light emission intensity of the delayed fluorescence and/or the phosphorescence which is measured after papers serving as an example of the object to be inspected 100 are irradiated with the excitation light. The drawing shows the time dependence data of the light emission intensity of the delayed fluorescence and/or the phosphorescence in each of a state in which each of two types of papers ("Papers 1", "Papers 2") is not heated, and a state immediately after each of the two types of papers ("Papers 1", "Papers 2") is heated with each of two patterns of heating time periods ("60 seconds", "120 seconds").

The determination unit 15 determines the state of the substance constituting the object to be inspected 100 by using, e.g., the shape of the time dependence data of the light emission intensity. In the case of the present example, in the case where each of the two types of papers is heated, the light emission intensity is increased as compared with the light emission intensity before each of the two types of papers is heated. In addition, in the case of the present example, as the heating time period for each of the two types of papers becomes longer, the light emission intensity becomes higher. The determination unit 15 determines whether or not the substance constituting the object to be inspected 100 is heated by extracting characteristics of the shape of the time dependence data of the light emission intensity and comparing the extracted characteristics with characteristics of the shape of the time dependence data of the light emission intensity of the known substance.

Figure 9:
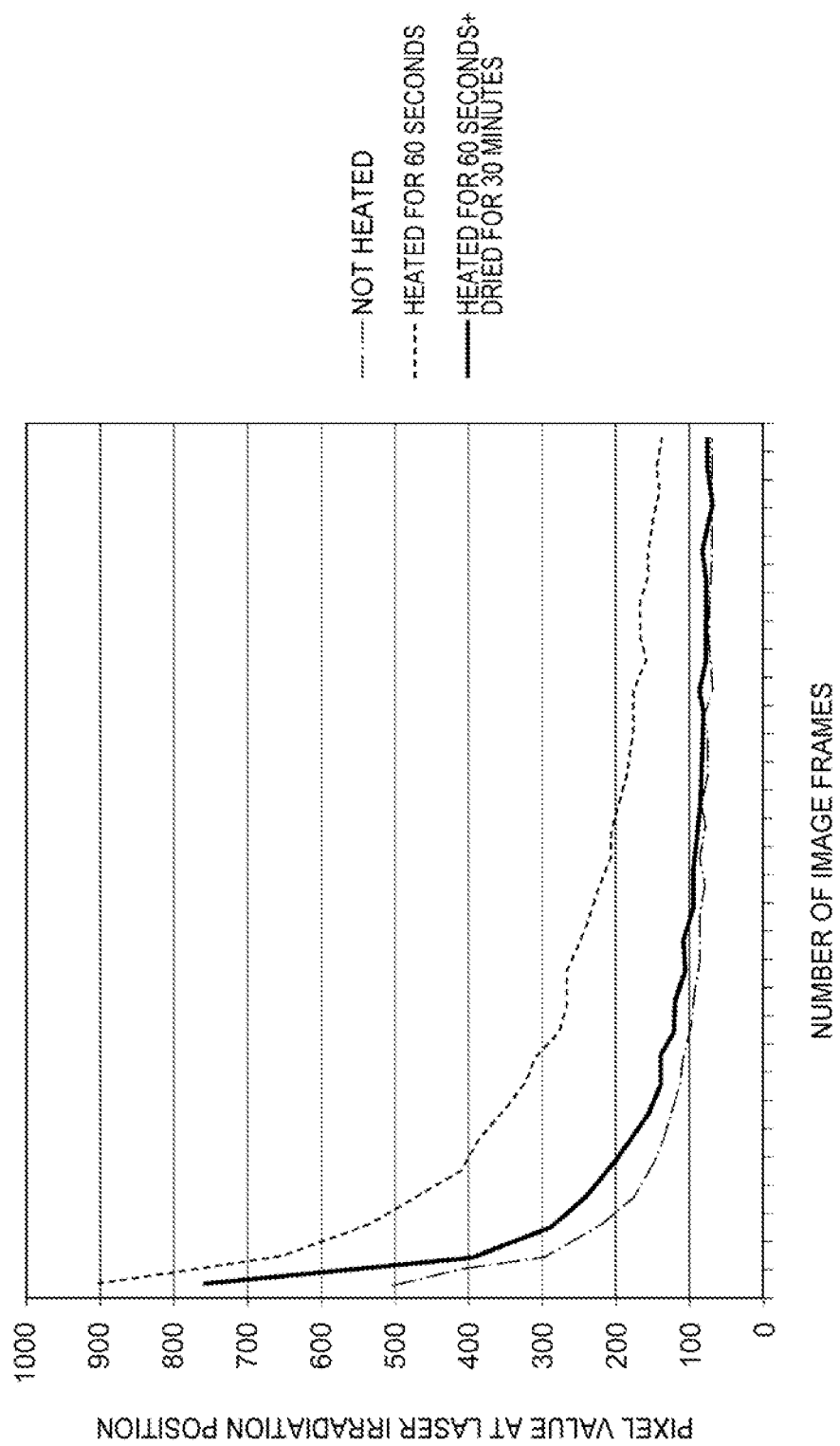
FIG. 9 is a view showing an example of the light emission data measured by the state determination device according to the first embodiment.

FIG. 9 is a view showing an example of the light emission data which is measured by the state determination device 10 according to the first embodiment. The light emission data is time dependence data of the light emission intensity of the delayed fluorescence and/or the phosphorescence which is measured after papers serving as an example of the object to be inspected 100 are irradiated with the excitation light. The drawing shows the time dependence data of the light emission intensity of the delayed fluorescence and/or the phosphorescence in each of a state in which the papers are not heated, a state in which the papers are heated for a predetermined time period (e.g., 60 seconds), and a state in which the papers are air-dried for a predetermined time period (e.g., 30 minutes) after being heated for a predetermined time period.

The determination unit 15 determines the state of the substance constituting the object to be inspected 100 by using, e.g., the shape of the time dependence data of the light emission intensity. In the case of the present example, in the case where the papers are heated, the light emission intensity is increased as compared with the light emission intensity before the papers are heated. In addition, in the case of the present example, when the papers are air-dried for the predetermined time period after being heated, the light emission intensity is lowered to a level before the papers are heated. The determination unit 15 determines whether or not the substance constituting the object to be inspected 100 is heated and is in a state immediately after the substance is heated by extracting characteristics of the shape of the time dependence data of the light emission intensity and comparing the extracted characteristics with characteristics of the shape of the time dependence data of the light emission intensity of the known substance.

Figure 10:
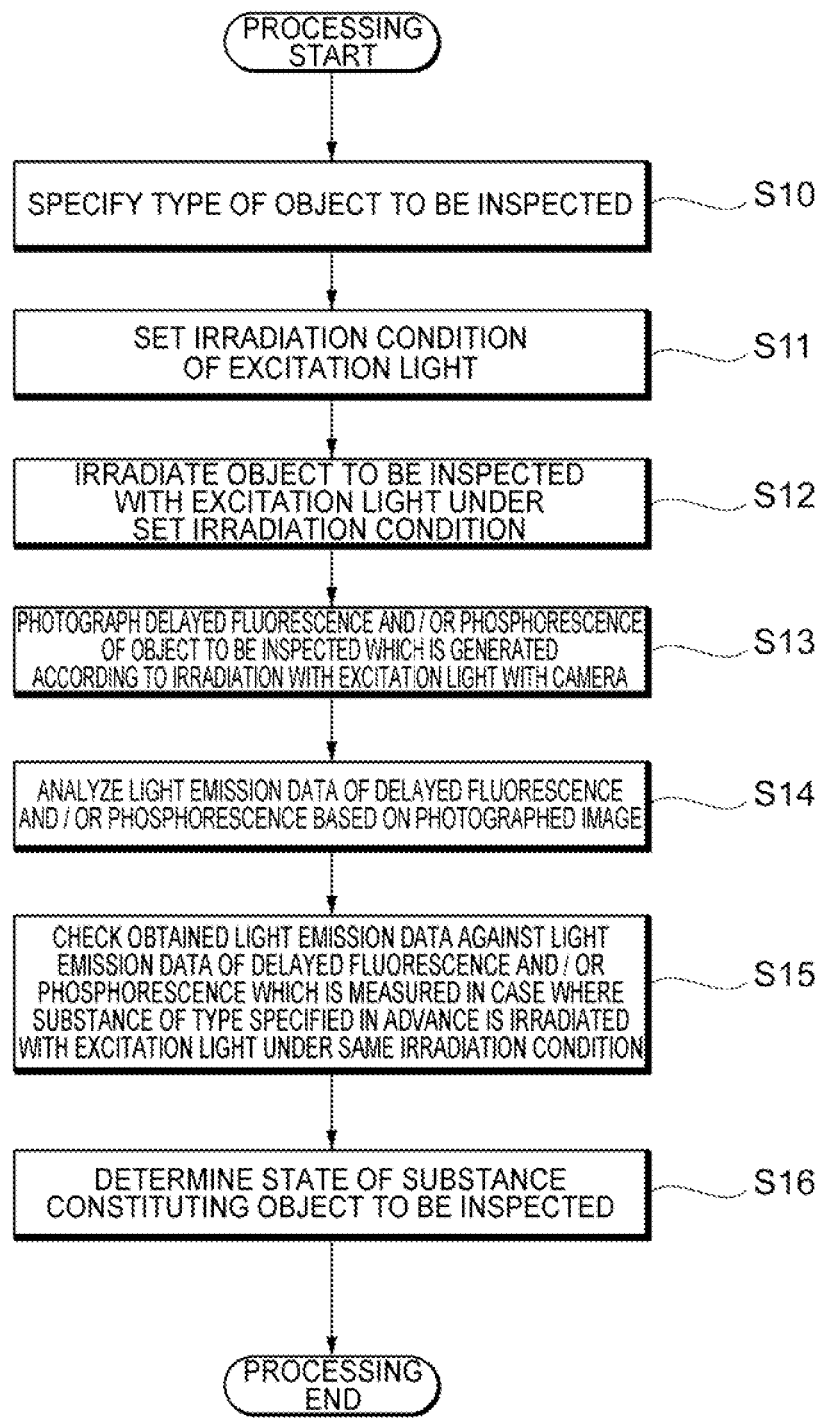
FIG. 10 is a view showing a flowchart of state determination processing executed by the state determination device according to the first embodiment.

FIG. 10 is a flowchart of state determination processing executed by the state determination device 10 according to the first embodiment, First, the state determination device 10 specifies the type of the object to be inspected 100 (S10). Next, the state determination device 10 sets the irradiation condition of the excitation light (S11). Subsequently, the state determination device 10 irradiates the object to be inspected 100 with the excitation light under the set irradiation condition (S12).

The state determination device 10 photographs the delayed fluorescence and/or the phosphorescence from the object to be inspected 100 which is generated according to the irradiation with the excitation light with the camera 13a (S13). Subsequently, the state determination device 10 analyzes the light emission data of the delayed fluorescence and/or the phosphorescence based on the photographed image (S14). Herein, the light emission data may include the time dependence data of the light emission intensity and the time-attenuation curve of the light emission intensity.

The state determination device 10 checks the obtained light emission data against the light emission data of the delayed fluorescence and/or the phosphorescence which is measured in the case where the substance of the type specified in advance is irradiated with the excitation light under the same condition (S15), Subsequently, the state determination device 10 determines the state of the substance constituting the object to be inspected 100 based on the similarity of the light emission data (S16). With the foregoing arrangement, the state determination processing is ended.

Second Embodiment

Hereinbelow, a second embodiment according to an aspect of the present invention will be described based on the drawings. The second embodiment is different from the first embodiment in the method for determining the state of the object to be inspected. Accordingly, in the following description, a configuration different from that in the first embodiment will be mainly described, and the duplicate description of a configuration identical or equivalent to that in the first embodiment will be omitted.

The determination unit 15 according to the second embodiment determines the state of the object to be inspected 100 by irradiating the object to be inspected 100 before an external factor is changed and the object to be inspected 100 after the external factor is changed with the excitation light under a predetermined irradiation condition, and comparing the light emission data of the object to be inspected 100 which is generated according to the irradiation with the excitation light before processing with the light emission data thereof after the processing. The external factor includes, e.g., predetermined processing performed on the object to be inspected 100. The predetermined processing includes, e.g., addition of water to and heating of the object to be inspected 100. The determination unit 15 determines the state of the object to be inspected 100 based on a change amount of the light emission data of the object to be inspected 100 after the processing with respect to the object to be inspected 100 before the processing. The object to be inspected 100 before the processing may be the unprocessed object to be inspected 100 and may also be the object to be inspected 100 on which the predetermined processing has been performed previously. For example, the determination unit 15 determines the state of the object to be inspected 100 based on the change amount of the light emission data of the object to be inspected 100 before and after the processing on the assumption that the type of the object to be inspected 100, and the tendency of the change of the light emission data of the object to be inspected 100 before and after the processing are acquired in advance. For example, in the case where the light emission data tends to be increased by heating of the object to be inspected 100, the determination unit 15 determines the state of the object to be inspected 100 based on an increase amount of the light emission data of the object to be inspected 100 before and after the processing. For example, in the case where the increase amount of the light emission data of the object to be inspected 100 before and after the processing is not less than a predetermined threshold value, the determination unit 15 determines that the object to be inspected 100 is caused to deteriorate by heating. The determination unit 15 may evaluate the degree of the deterioration of the object to be inspected 100 by heating quantitatively based on, e.g., the increase amount of the light emission data of the object to be inspected 100 before and after the processing.

Figure 11:
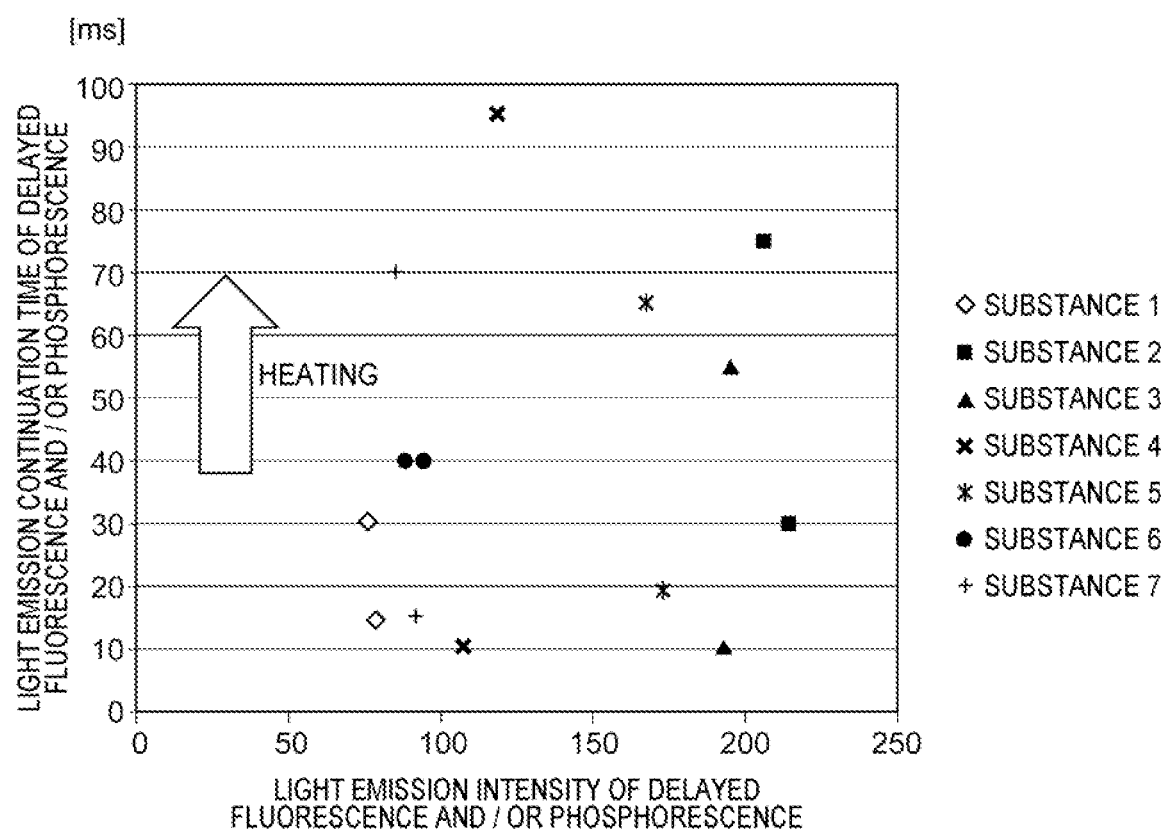
FIG. 11 a view showing examples of the light emission intensity of delayed fluorescence and/or phosphorescence and change of light emission continuation time of the delayed fluorescence and/or the phosphorescence from each substance before and after heating.

FIG. 11 is a view showing examples of the light emission intensity of the delayed fluorescence and/or the phosphorescence and change of light emission continuation time of the delayed fluorescence and/or the phosphorescence from each substance immediately after heating at a heating temperature of 200° C. In the drawing, for each of a plurality of substances ("Substance 1", "Substance 2", "Substance 3", "Substance 4", "Substance 5", "Substance 6", and "Substance 7"), examples of the light emission intensity of the delayed fluorescence and/or the phosphorescence and the change of the light emission continuation time of the delayed fluorescence and/or the phosphorescence immediately after heating at the heating temperature of 200° C. are shown. In the examples, a significant change of fluorescence intensity before and after heating is not seen in any of the substances. On the other hand, with regard to the light emission continuation time of the delayed fluorescence and/or the phosphorescence, a change before and after heating is seen in each of "Substance 1", "Substance 2", "Substance 3", "Substance 4", "Substance 5", and "Substance 7", but a significant change before and after heating is not seen in "Substance 6". In addition, with regard to the light emission continuation time of the delayed fluorescence and/or the phosphorescence, change amounts before and after heating in "Substance 1", "Substance 2", "Substance 3", "Substance 4", "Substance 5" and "Substance 7" are different from each other.

The determination unit 15 determines the state of the object to be inspected 100 based on the change amount of the light emission continuation time of the delayed fluorescence and/or the phosphorescence from the object to be inspected 100 before and after heating. For example, the determination unit 15 specifies the type of the object to be inspected 100 from "Substance 1" to "Substance 7" In addition, for the object to be inspected 100 of the specified type, the determination unit 15 determines the state of the object to be inspected 100 based on the change amount of the light emission continuation time of the delayed fluorescence and/or the phosphorescence from the object to be inspected 100 before and after heating. For example, the determination unit 15 determines the state of the object to be inspected 100 by comparing the change amount of the light emission continuation time of the delayed fluorescence and/or the phosphorescence from the object to be inspected 100 in the case where the object to be inspected 100 is heated under a predetermined heating condition with the change amount of the light emission continuation time of the delayed fluorescence and/or the phosphorescence in the case where the substance of the specified type is heated under the same heating condition. For example, the determination unit 15 compares the change amount of the light emission continuation time of the delayed fluorescence and/or the phosphorescence from the object to be inspected 100 in the case where the object to be inspected 100 is heated under a predetermined heating condition with a threshold value corresponding to the specified type and, in the case where the change amount of the light emission continuation time of the delayed fluorescence and/or the phosphorescence is not less than the threshold value, the determination unit 15 determines that the object to be inspected 100 is caused to deteriorate by heating.

Figure 12:
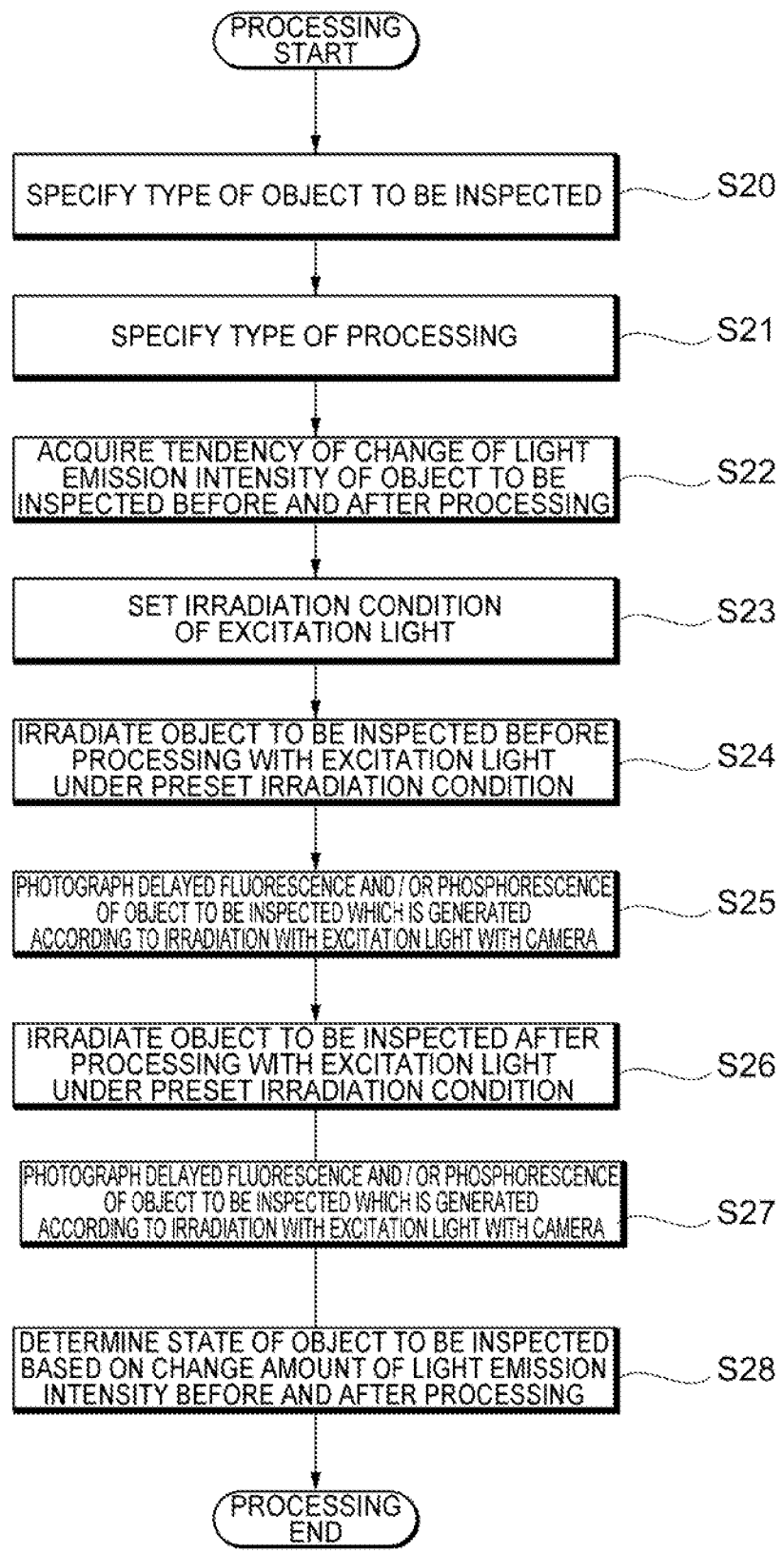
FIG. 12 is a view showing a flowchart of the state determination processing executed by the state determination device according to a second embodiment.

FIG. 12 is a flowchart of the state determination processing executed by the state determination device 10 according to the second embodiment. First, the state determination device 10 specifies the type of the object to be inspected 100 (S20). Next, the state determination device 10 specifies the type of the processing performed on the object to be inspected 100 (S21). Next, the state determination device 10 acquires the tendency of the change of the light emission intensity of the object to be inspected 100 before and after the processing (S22). For example, the state determination device 10 acquires information indicative of whether the light emission intensity of the object to be inspected 100 tends to be increased or decreased after the processing from the light emission intensity thereof before the processing, Next, the state determination device 10 sets the irradiation condition of the excitation light (S23). Next, the state determination device 10 irradiates the object to be inspected 100 before the processing with the excitation light under the preset irradiation condition (S24). The state determination device 10 photographs the delayed fluorescence and or the phosphorescence from the object to be inspected 100 which is generated according to the irradiation with the excitation light with the camera 13a (S25). Subsequently, the state determination device 10 analyzes the light emission data (first light emission data) of the delayed fluorescence and/or the phosphorescence based on the photographed image. Herein, the first light emission data may include the time dependence data of the light emission intensity and the time-attenuation curve of the light emission intensity. Next, the state determination device 10 irradiates the object to be inspected 100 after the processing with the excitation light under the preset irradiation condition (S26). The state determination device 10 photographs the delayed fluorescence and/or the phosphorescence from the object to be inspected 100 which is generated according to the irradiation with the excitation light with the camera 13a (S27). Subsequently, the state determination device 10 analyzes second light emission data of the delayed fluorescence and or the phosphorescence based on the photographed image. Herein, the second light emission data may include the time dependence data of the light emission intensity and the time-attenuation curve of the light emission intensity. The state determination device 10 determines the state of the object to be inspected 100 based on the change amount of the light emission intensity before and after the processing (S28). With the foregoing arrangement, the state determination processing is ended.

Third Embodiment

Hereinbelow, a third embodiment according to an aspect of the present Invention will be described based on the drawings. The third embodiment is different from the first embodiment in the method for determining the state of the object to be inspected. Accordingly, in the following description, a configuration different from that in the first embodiment will be mainly described, and the duplicate description of a configuration identical or equivalent to that in the first embodiment will be omitted.

Figure 13:
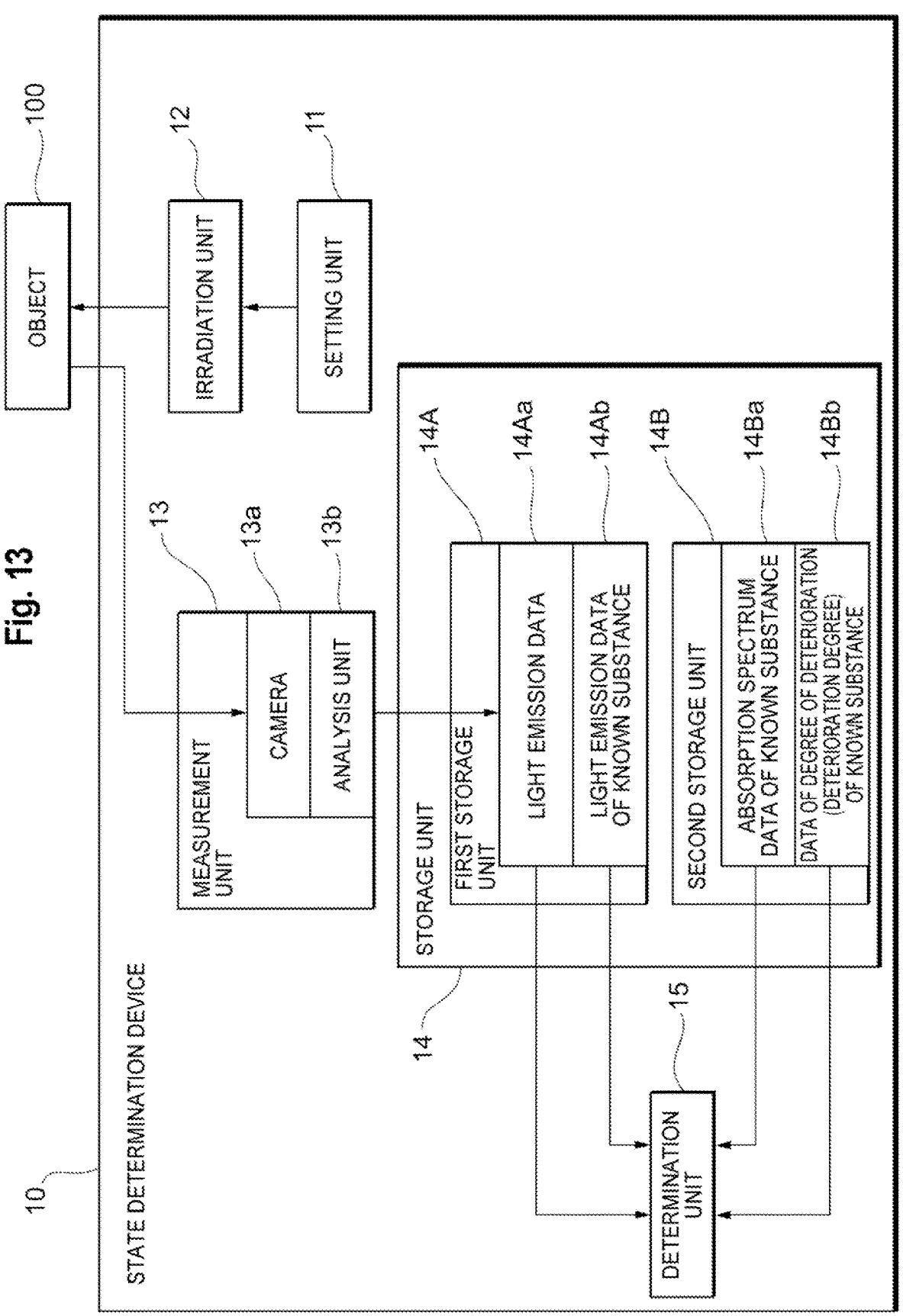
FIG. 13 is a view showing a functional block of the state determination device according to a third embodiment of the present invention.

In FIG. 13, the storage unit 14 of the state determination device 10 according to the third embodiment includes a first storage unit 14A and a second storage unit 14B.

The first storage unit 14A stores light emission data 14Aa of the delayed fluorescence and/the phosphorescence which is measured in the case where the object to be inspected 100 is irradiated with the excitation light under a given irradiation condition, and light emission data 14Ab of the delayed fluorescence and/or the phosphorescence which is measured for each of various states of various substances in the case where the known substance is irradiated with the excitation light under one or a plurality of irradiation conditions.

The second storage unit 146 stores absorption spectrum data 14Ba which is measured in the case where the known substance is irradiated with the excitation light under one or a plurality of irradiation conditions, and deterioration degree data 146b indicative of a degree of deterioration of the known substance which is measured in the case where the known substance is irradiated with the excitation light under one or a plurality of irradiation conditions. The absorption spectrum data 14Ba and the deterioration degree data 148b are associated with each combination of the type of the known substance and the irradiation condition of the excitation light as a known database. Note that examples of the absorption spectrum include an infrared absorption spectrum and a Raman spectrum.

The determination unit 15 checks the absorption spectrum data 14Ba of each degree of deterioration of the substance of the type specified in advance against the absorption spectrum data of the object to be inspected 100 measured by the measurement unit 13, and determines the degree of the deterioration of the object to be inspected 100. For example, the determination unit 15 calculates the absorption spectrum data of the object to be inspected 100 based on the light emission data 14Aa measured by the measurement unit 13, and checks the calculated absorption spectrum data against the absorption spectrum data 14Ba of each type of the known substance which is stored in advance in the second storage unit 14B. Subsequently, the determination unit 15 determines the degree of the deterioration of the object to be inspected 100 based on the deterioration degree data 14Bb associated with the checked absorption spectrum data 14Ba.

Next, a description will be given of processing of determining the degree of the deterioration of the object to be inspected 100.

Figure 14:
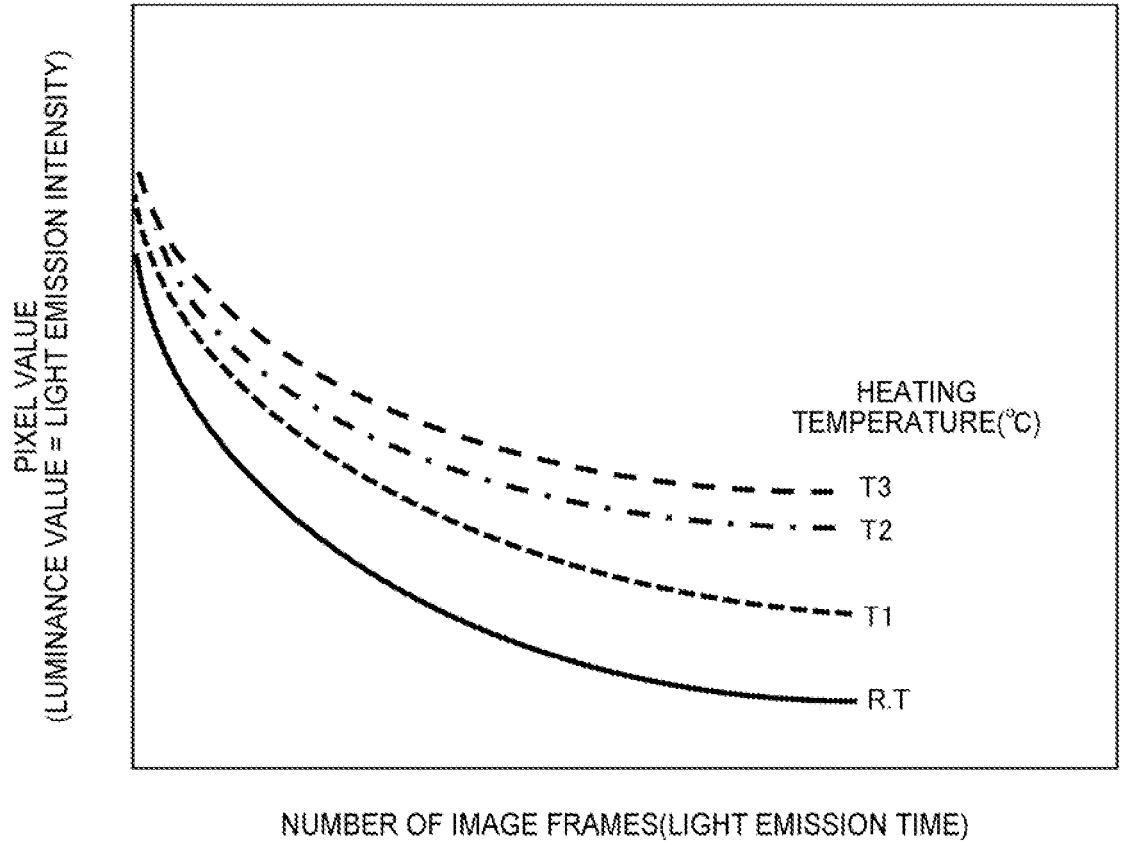
FIG. 14 is a view showing an example of the time dependence of the light emission intensity.

FIG. 14 is a view showing an example of the time dependence of the light emission intensity, in the example shown in the drawing, the object to be inspected 100 is papers, and a correlation between light emission time from immediately after heating of papers and a pixel value is shown. In this example, a luminance value indicative of the light emission intensity of the papers in an image frame is evaluated as the pixel value, and the number of image frames from immediately after heating of the papers is evaluated as the light emission time, and the heating temperature of the papers is classified into four levels which are RT (room temperature), T1, T2, and T3. The heating temperature satisfies RT<T1<T2<T3. This example shows that, as the heating temperature of the papers is higher, the degree of attenuation of the light emission intensity based on the passage of the light emission time is smaller.

Figure 15:
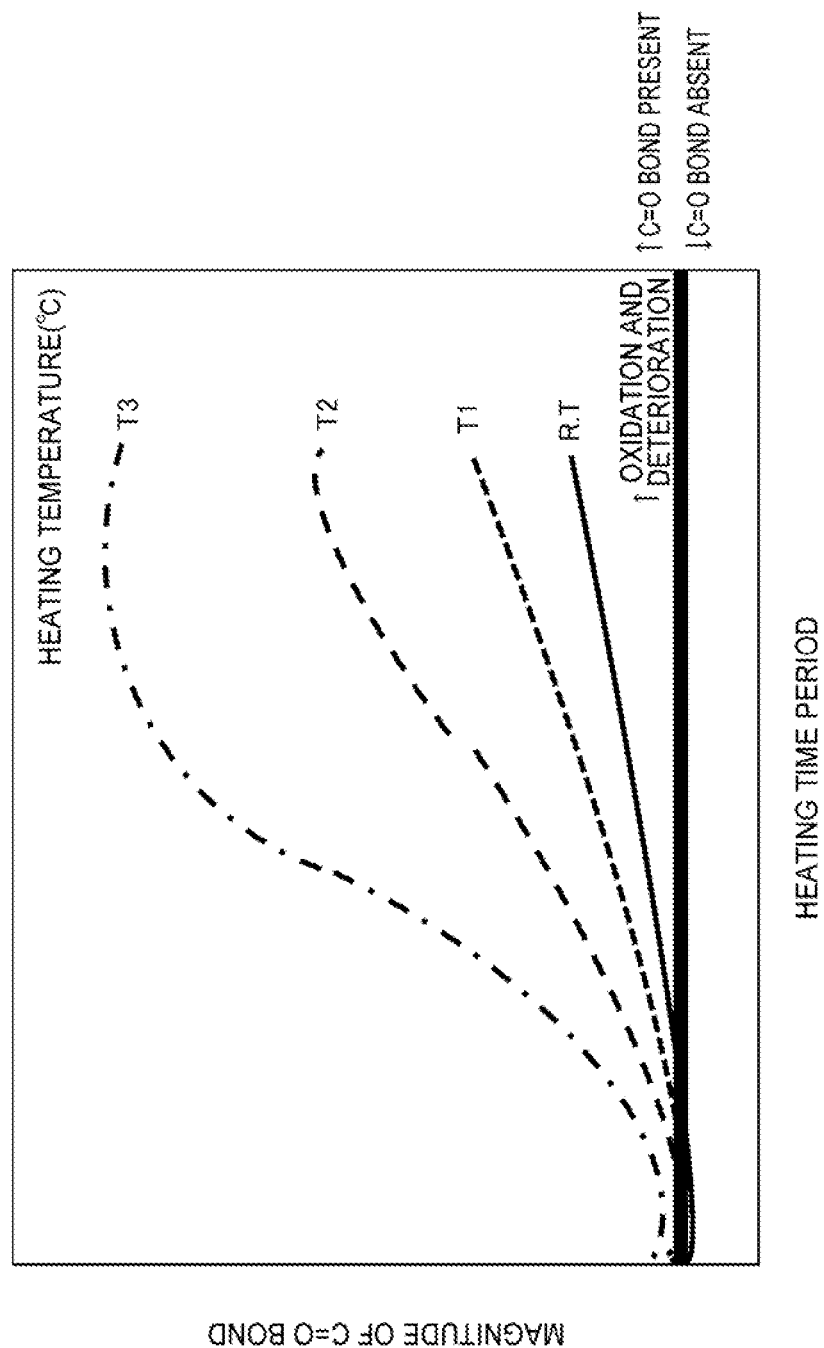
FIG. 15 is a view showing examples of an external factor (heating temperature) and the magnitude of bond of a functional group.

FIG. 15 is a view showing examples of an external factor and the magnitude of bond of a functional group. In an example shown in the drawing, the object to be inspected 100 is papers, and a correlation between the heating time period of the papers and the magnitude of CO=O bond serving as an example of the functional group generated by oxidation and deterioration of the papers is shown. In this example, the magnitude of an absorption peak in the vicinity of 1730 $cm^{-1}$ derived from the C=O bond when heated papers are analyzed with the FT-IR is evaluated as the magnitude of the C=O bond, and the heating temperature of the papers is classified into four levels which are RT, T1, T2, and T3. This example shows that, as the heating temperature of the papers is higher, oxidation and deterioration caused by heating of the papers is more advanced.

Figure 16:
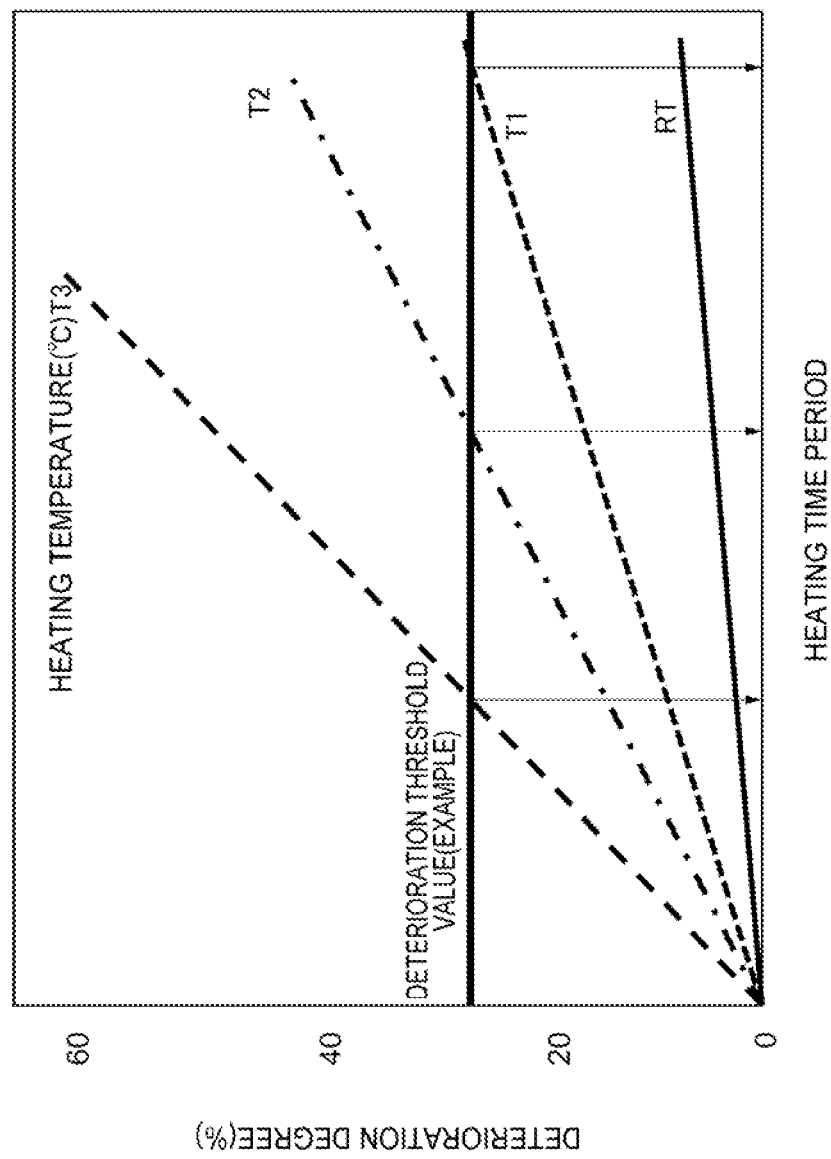
FIG. 16 is a view showing an example of a relationship between the external factor (heating time period) and a deterioration degree.

FIG. 16 is a view showing an example of a relationship between the external factor and the deterioration degree. In the example shown in the drawing, the object to be inspected 100 is papers, and a correlation between the heating time period of the papers and the deterioration degree of the papers is shown. In this example, the magnitude of the C=O bond caused by heating of the papers shown in FIG. 15 is evaluated as the deterioration degree of the papers, and the heating temperature of the papers is classified into four levels which are RT, T1, T2, and 13. This example shows that, as the heating temperature of the papers is higher, the heating time period required for the deterioration degree of the papers to reach a deterioration threshold value is shorter.

Figure 17:
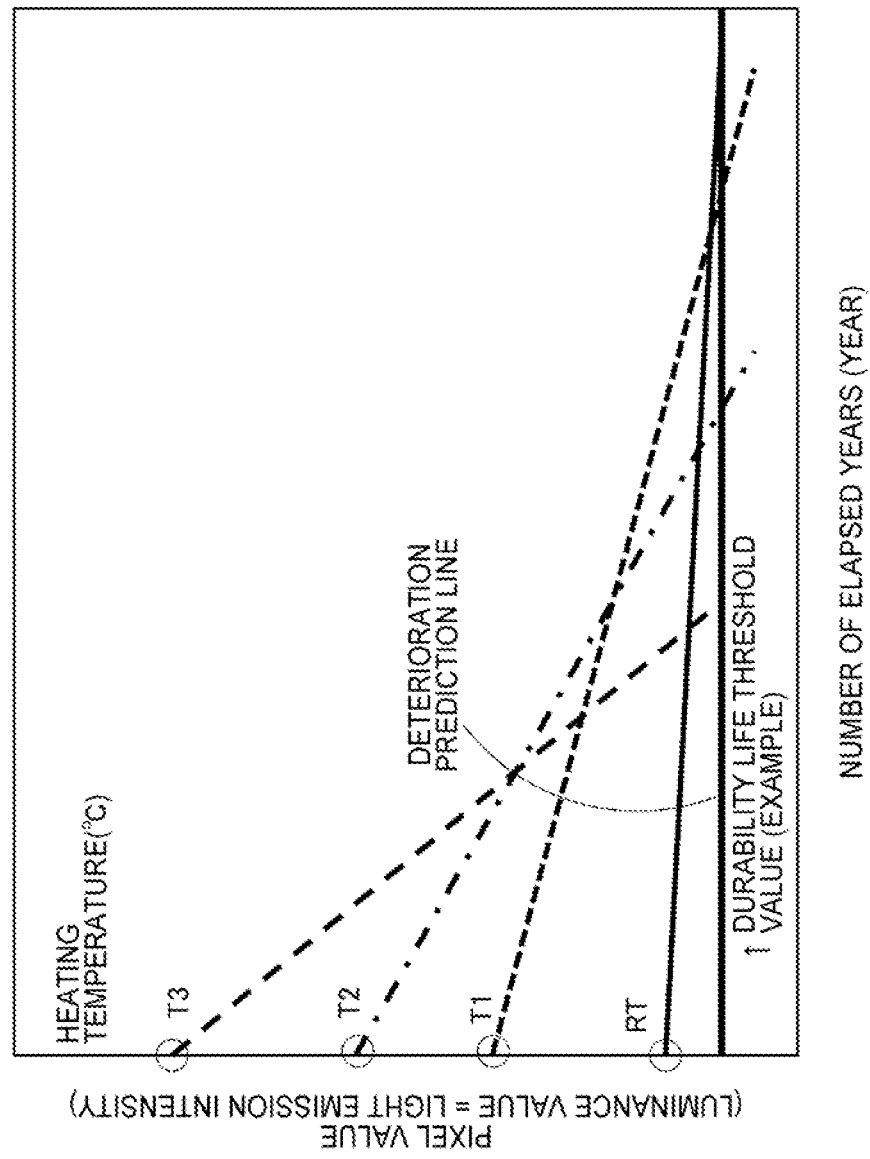
FIG. 17 is a view showing an example of a relationship between the number of years of a durability life and a pixel value.

FIG. 17 is a view showing an example of a relationship between the number of years of a durability life and the pixel value. In the example shown in the drawing, the object to be inspected 100 is papers, and a correlation between the number of elapsed years from heating of the papers and the pixel value is shown. In this example, the luminance value indicative of the light emission intensity of the papers is evaluated as the pixel value, and the heating temperature of the papers is classified into four levels which are RT, T1, T2, and T3. This example shows that the origin of the horizontal axis of a graph represents a point of time immediately after heating of the papers (e.g., 28 milliseconds later) and, as the pixel value after heating of the papers is lower, the deterioration of the papers is more advanced. In addition, this example shows that, as the heating temperature of the papers is higher, the progress of the deterioration of the papers based on the number of elapsed years from heating of the papers is faster, and the number of elapsed years required for the light emission intensity of the papers to reach a threshold value corresponding to the number of years of the durability life is shorter. The state determination device 18 can estimate the number of years of the durability life of the papers by calculating a deterioration prediction line of the papers from a change in the pixel value in a predetermined time period from heating of the papers, and determining an intersection of the deterioration prediction line and the threshold value corresponding to the durability life.

Figure 18:
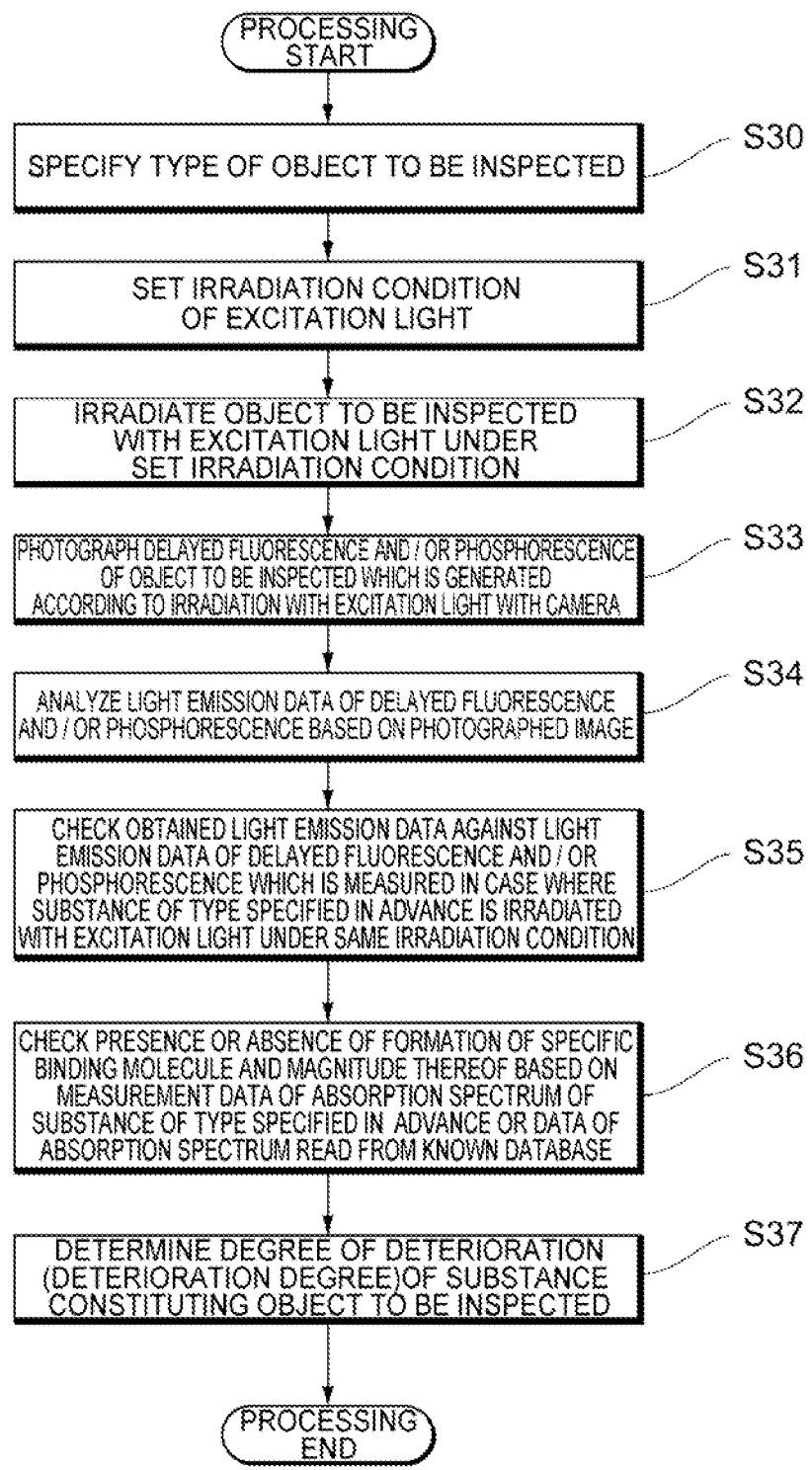
FIG. 18 is a view showing a flowchart of the state determination processing executed by the state determination device according to the third embodiment.

FIG. 18 is a flowchart of the state determination processing executed by the state determination device 10 according to the third embodiment. First, the state determination device 10 specifies the type of the object to be inspected 100 (S30). Next, the state determination device 10 sets the irradiation condition of the excitation light (S31). Subsequently, the state determination device 10 irradiates the object to be inspected 100 with the excitation light under the set irradiation condition (S32).

The state determination device 10 photographs the delayed fluorescence and/or the phosphorescence from the object to be inspected 100 which is generated according to the irradiation with the excitation light with the camera 13a (S33). Subsequently, the state determination device 10 analyzes the light emission data of the delayed fluorescence and/or the phosphorescence based on the photographed image (S34). Herein, the light emission data may include the time dependence data of the light emission intensity and the time-attenuation curve of the light emission intensity.

The state determination device 10 checks the obtained light emission data against the light emission data of the delayed fluorescence and/or the phosphorescence which is measured in the case where the substance of the type specified in advance is irradiated with the excitation light under the same irradiation condition (S35).

The state determination device 10 checks the presence or absence of formation of a specific binding molecule and the magnitude thereof based on measurement data of the absorption spectrum of the substance of the type specified in advance or data of the absorption spectrum read from a known database (S36). The specific binding molecule includes a specific functional group generated by the deterioration of the object to be inspected 100 such as, e.g., C=O bond, —OH bond, —NH$_2$ bond, and —COOH bond.

Subsequently, the state determination device 10 determines the degree of the deterioration (deterioration degree) of the substance constituting the object to be inspected 100 based on the presence or absence of the formation of the specific binding molecule and the magnitude thereof checked in Step S36 mentioned above (S37). With the foregoing arrangement, the state determination processing is ended.

The embodiments described thus far are simply for facilitating the understanding of the present invention and are not in any way to be construed as limiting the present invention. Individual elements of the embodiments and the arrangement thereof, materials, conditions, shapes, and sizes are not intended to be limited to those shown as examples, and can be appropriately changed. In addition, the configurations described in different embodiments can be partially replaced or combined.

REFERENCE SIGNS LIST

10 State determination device
10a CPU
10b RAM
10c ROM
10d Communication unit
10e Input unit
10f Display unit
11 Setting unit
12 irradiation unit
13 Measurement unit
13a Camera
13b Analysis unit
14 Storage unit
14A First storage unit
14B Second storage unit
14a, 14Aa, 14Ab Light emission data
14b Light emission data of known substance
14Ba Absorption spectrum data of known substance
14Bb Data of degree of deterioration (deterioration degree) of known substance
15 Determination unit
100 Object to be inspected

What is claimed is:

1. A state determination device comprising:
an irradiation device which irradiates an object to be inspected with excitation light under a predetermined irradiation condition;
a measurement device which measures a first light emission data as light emission data of light emission from the object to be inspected, which is generated with a delay with respect to the irradiation with the excitation light; and
a processor which determines a state of the object to be inspected by checking the first light emission data against second light emission data as light emission data of light emission from the object to be inspected, which is measured in a case where the excitation light is emitted under an irradiation condition common to the first light emission data for each state of a substance constituting the object to be inspected, wherein
when the first light emission data is acquired from the object to be inspected in a new or unprocessed state, the second light emission data is acquired from the object to be inspected in a state changed by applying an external factor,
when the first light emission data is acquired from the object to be inspected in the state changed by applying the external factor, the second light emission data is acquired from the object to be inspected in the new or unprocessed state, and
when the first light emission data is acquired from the object to be inspected to which an external factor is being applied, the second light emission data is acquired from the object to be inspected in the new or unprocessed state, or acquired previously from the object to be inspected in the state changed by applying the external factor.

2. The state determination device according to claim 1, wherein the light emission data of the light emission from the object to be inspected is light emission data of delayed fluorescence and/or phosphorescence from the object to be inspected, which is generated according to the irradiation with the excitation light.

3. The state determination device according to claim 1, wherein the measurement device includes a high speed camera which photographs the light emission at a frame rate of not less than 100 fps.

4. The state determination device according to claim 1, wherein the processor reads reference light emission data of the object to be inspected, which is stored in advance in a storage, and determines the state of the object to be inspected by using the reference light emission data that has been read and the first light emission data measured by the measurement device, wherein
when the first light emission data is acquired from the object to be inspected in the new or unprocessed state, the reference light emission data is acquired from the object to be inspected in the state changed by applying the external factor,
when the first light emission data is acquired from the object to be inspected in the state changed by applying the external factor, the reference light emission data is acquired from the object to be inspected in the new or unprocessed state, and
when the first light emission data is acquired from the object to be inspected to which the external factor is being applied, the reference light emission data is acquired from the object to be inspected in the new or unprocessed state, or acquired previously from the object to be inspected in the state changed by applying the external factor.

5. The state determination device according to claim 1, wherein the processor determines, as the state of the object to be inspected, a degree of deterioration of the object to be inspected by checking light emission data of each deterioration degree of the object to be inspected, which is stored in advance in a storage, against the light emission data measured by the measurement device.

6. The state determination device according to claim 1, wherein a wavelength of the excitation light is not less than 10 nm.

7. The state determination device according to claim 1, wherein the light emission data includes light emission data of light emission from the object to be inspected, which is generated after the irradiation with the excitation light is stopped.

8. A state determination device comprising:
an irradiation device which irradiates an object to be inspected with excitation light under a predetermined irradiation condition;
a measurement device which measures light emission data before change as light emission data of light emission from the object to be inspected, which is generated with a delay with respect to the irradiation with the excitation light, and measures light emission data after change as light emission data of light emission from the object to be inspected, which is generated according to the irradiation with the excitation light after an external factor of the object to be inspected is changed; and
a processor which determines a state of the object to be inspected based on the change of the external factor of the object to be inspected on a basis of a change degree of the light emission data after change relative to the light emission data before change,
wherein the state of the object to be inspected changed by applying the external factor is any one of, or a combination of, a state in which water serving is added to the object to be inspected, a state in which a pH is different, a state in which an electromagnetic wave is applied to the object to be inspected, a state in which the object to be inspected is heated, a state in which the object to be inspected is exposed to air and various gases, and a state in which mechanical stress is applied to the object to be inspected.

9. The state determination device according to claim 8, wherein the processor determines, as the state of the object to be inspected, a degree of deterioration of the object to be inspected by checking light emission data of each deterioration degree of the object to be inspected, which is stored in advance in a storage, against the light emission data measured by the measurement device.

10. The state determination device according to claim 8, wherein a wavelength of the excitation light is not less than 10 nm.

11. The state determination device according to claim 8, wherein the light emission data includes light emission data of light emission from the object to be inspected, which is generated after the irradiation with the excitation light is stopped.

12. A state determination method comprising:
an irradiation step of irradiating an object to be inspected with excitation light under a predetermined irradiation condition;
a measurement step of measuring first light emission data as light emission data of light emission from the object to be inspected, which is generated with a delay with respect to the irradiation with the excitation light; and
a determination step of determining a state of the object to be inspected by checking the first light emission data against second light emission data as light emission data of light emission from the object to be inspected which is measured in a case where the excitation light is emitted under an irradiation condition common to the first light emission data for each state of a substance constituting the object to be inspected, wherein
when the first light emission data is acquired from the object to be inspected in a new or unprocessed state, the second light emission data is acquired from the object to be inspected in a state changed by applying an external factor,
when the first light emission data is acquired from the object to be inspected in the state changed by applying the external factor, the second light emission data is acquired from the object to be inspected in the new or unprocessed state, and
when the first light emission data is acquired from the object to be inspected to which the external factor is being applied, the second light emission data is acquired from the object to be inspected in the new or unprocessed state, or acquired previously from the object to be inspected in the state changed by applying the external factor.

13. The state determination method according to claim 12, wherein, in the determination step, reference light emission data of the object to be inspected, which is stored in advance in a storage, is read and the state of the object to be inspected is determined by using the reference light emission data that has been read and the first light emission data that has been measured, wherein when the first light emission data is acquired from the object to be inspected in the new or unprocessed state, the reference light emission data is acquired from the object to be inspected in the state changed by applying the external factor, when the first light emission data is acquired from the object to be inspected in the state changed by applying the external factor, the reference light emission data is acquired from the object to be inspected in the new or unprocessed state, and when the first light emission data is acquired from the object to be inspected to which an external factor is being applied, the reference light emission data is acquired from the object to be inspected in the new or unprocessed state, or acquired previously from the object to be inspected in the state changed by applying the external factor.

14. A state determination program causing a computer to execute:

processing of irradiating an object to be inspected with excitation light under a predetermined irradiation condition;

processing of measuring first light emission data as light emission data of light emission from the object to be inspected, which is generated with a delay with respect to the irradiation with the excitation light; and processing of determining a state of the object to be inspected by checking the first light emission data against second light emission data as light emission data of light emission from the object to be inspected, which is measured in a case where the excitation light is emitted under an irradiation condition common to the first light emission data for each state of a substance constituting the object to be inspected, wherein when the first light emission data is acquired from the object to be inspected in a new or unprocessed state, the second light emission data is acquired from the object to be inspected in a state changed by applying an external factor, when the first light emission data is acquired from the object to be inspected in the state changed by applying the external factor, the second light emission data is acquired from the object to be inspected in the new or unprocessed state, and when the first light emission data is acquired from the object to be inspected to which the external factor is being applied, the second light emission data is acquired from the object to be inspected in the new or unprocessed state, or acquired previously from the object to be inspected in the state changed by applying the external factor.

15. A state determination device comprising:

an irradiation device which irradiates an object to be inspected with excitation light under a predetermined irradiation condition;

a measurement device which measures first light emission data as light emission data related to light emission of the object to be inspected, which is generated with a delay with respect to the irradiation with the excitation light; and a processor which determines a state of the object to be inspected based on the first light emission data and second light emission data as light emission data related to light emission, which is generated with a delay in a case where the excitation light is emitted under the predetermined irradiation condition for each state of a substance constituting the object to be inspected, wherein when the first light emission data is acquired from the object to be inspected in a new or unprocessed state, the second light emission data is acquired from the object to be inspected in a state changed by applying an external factor, when the first light emission data is acquired from the object to be inspected in the state changed by applying the external factor, the second light emission data is acquired from the object to be inspected in the new or unprocessed state, and when the first light emission data is acquired from the object to be inspected to which the external factor is being applied, the second light emission data is acquired from the object to be inspected in the new or unprocessed state, or acquired previously from the object to be inspected in the state changed by applying the external factor.

* * * * *